(12) United States Patent
Miyazaki et al.

(10) Patent No.: US 6,307,831 B1
(45) Date of Patent: Oct. 23, 2001

(54) DISC CARTRIDGE HAVING REFERENCE HOLES

(75) Inventors: Yukio Miyazaki; Masaru Ikebe; Masatoshi Okamura, all of Nagano (JP)

(73) Assignee: TDK Corporation (JP)

(*) Notice: Subject to any disclaimer, the term of this patent is extended or adjusted under 35 U.S.C. 154(b) by 0 days.

(21) Appl. No.: 09/095,411

(22) Filed: Jun. 10, 1998

(30) Foreign Application Priority Data

| Jun. 10, 1997 | (JP) | ................................................... | 9-166693 |
| Jul. 4, 1997 | (JP) | ................................................... | 9-193343 |
| Sep. 16, 1997 | (JP) | ................................................... | 9-268260 |
| Sep. 16, 1997 | (JP) | ................................................... | 9-268261 |
| Dec. 15, 1997 | (JP) | ................................................... | 9-362533 |

(51) Int. Cl.[7] .................................................. G11B 23/03
(52) U.S. Cl. ........................................... 369/291; 360/133
(58) Field of Search .................................... 369/291, 289; 360/133; 367/290

(56) References Cited

U.S. PATENT DOCUMENTS

| 3,668,658 | 6/1972 | Flores et al. ................... 340/174.1 C |
| 4,911,301 | 3/1990 | Dieffenbach ........................... 206/444 |
| 5,272,693 | * 12/1993 | Fujisawa ............................... 369/291 |
| 5,526,337 | 6/1996 | Housey et al. ........................ 369/291 |
| 5,537,389 | * 7/1996 | Kuwa et al. ........................... 369/291 |
| 5,805,566 | * 9/1998 | Kobayashi ............................. 369/291 |
| 5,831,968 | * 11/1998 | Tanaka .................................. 369/291 |
| 5,850,384 | * 12/1998 | Ohmori et al. ........................ 369/291 |
| 5,898,659 | * 4/1999 | Goto ..................................... 369/77.2 |
| 6,078,563 | * 6/2000 | Goto et al. ............................ 369/291 |

FOREIGN PATENT DOCUMENTS

| 295 00 045 U1 | 9/1995 | (DE) . |
| 195 23 078 A1 | 2/1996 | (DE) . |
| 0 239 996 A2 | 10/1987 | (EP) . |
| 0 430 162 A2 | 6/1991 | (EP) . |
| 0430162 A3 | 6/1991 | (EP) . |
| 0 638 901 A1 | 2/1995 | (EP) . |
| 61-156070 | 9/1986 | (JP) . |
| 1-78478 (A) | 3/1989 | (JP) . |
| 6-4469 | 2/1994 | (JP) . |
| 6-180964 (A) | 6/1994 | (JP) . |

OTHER PUBLICATIONS

Patent Abstracts of Japan, vol. 017, No. 681 (P–1660), Dec. 14, 1993 & JP 05 225742 A, Sep. 3, 1993.

* cited by examiner

Primary Examiner—Brian E. Miller
Assistant Examiner—Kenneth W. Fields
(74) Attorney, Agent, or Firm—Lerner, David, Littenberg, Krumholz & Mentlik, LLP

(57) ABSTRACT

A disc cartridge of a three-piece structure capable of being kept from being caught in an information recording/reproducing apparatus during loading/unloading thereof with respect to the apparatus. The disc cartridge includes an upper plate, a lower plate, and a center frame arranged between the upper plate and the lower plate, which are joined to each other to form a casing in which a disc-like medium is received. The upper plate defines the whole upper surface region of the disc cartridge, whereas the lower plate defines the whole lower surface region of the disc cartridge. The disc cartridge also includes an engaged structure in which an engagement structure of the information recording/reproducing apparatus is engagedly fitted. The engaged structure is constituted by only the lower plate.

9 Claims, 17 Drawing Sheets

DISC CARTRIDGE HAVING REFERENCE HOLES

BACKGROUND OF THE INVENTION

This invention relates to a disc cartridge for a minidisc (MD) or the like having a disc-like medium such as an optical disc or the like received therein, and more particularly to such a disc cartridge of a three-piece structure wherein an upper plate and a lower plate are joined to each other through a center frame interposedly arranged therebetween.

A disc cartridge which has been conventionally known in the art is generally constructed in such a manner as shown in FIG. 1 by way of example. More particularly, a conventional disc cartridge generally designated at reference numeral 100 in FIG. 1 includes a lower plate 110 and an upper plate 150 securely joined to each other by means of screws 186 while being superposed on each other and having a disc-like medium 170 received therebetween, resulting in being constructed into a two-piece structure.

The lower plate 110 and upper plate 150 of the disc cartridge 100 are respectively formed with openings 111 and 151 through which a recording/reproducing head of an information recording/reproducing apparatus or the like is inserted into the disc cartridge to carry out recording/reproducing of data with respect to the disc-like medium 170. The disc cartridge 100 includes a shutter 180 of a substantially U-shape in section arranged so as to render the openings 111 and 151 open when the head or the like is inserted therethrough and closed otherwise. The shutter 180 is provided on both ends thereof with engagements 181, through which the shutter 180 is engaged with both upper and lower plates 150 and 110. The lower plate 110 is provided thereon with a shutter lock 153 for locking the shutter 180 at a position at which the shutter 180 closes the openings 111 and 151.

Also, the upper and lower plates 150 and 110 are formed on a side surface thereof with depressions or recesses 152 and 112, which cooperate with each other to provide a labeling region when both plates are joined together.

The upper plate 150 is provided thereon with a shutter slide region 153 including the opening 151. The shutter slide region 153 is formed into a reduced thickness so that an outer surface of the shutter 180 and that of the upper plate 150 are flush with each other when the shutter is mounted on the upper and lower plates 150 and 110. This is also true of the lower plate 110.

The upper plate 150 is provided with a gate 154 for molding thereof, which is located in the shutter slide region 153. A failure in cutting of the gate 154 leads to occurrence of burrs. This would deteriorate satisfactory sliding of the shutter 180 and leads to occurrence of shavings, to thereby causes dropout. In order to avoid the possible problem, the gate 154 is formed in a manner to be depressed from an outer surface of the shutter slide region 153. Also, in order to ensure satisfactory flowing of resin during molding of the upper plate 150, the upper plate 150 is formed at a portion of an inner surface thereof positionally corresponding to the gate 154 with a projection-like cold slug well (not shown).

It is generally required that the disc cartridge 100 is formed so as to exhibit rigidity or durability sufficient to ensure outdoor use thereof. Such an increase in rigidity would be attained by increasing a thickness of the upper and lower plates 150 and 110. Unfortunately, this causes occurrence of a sink mark, leading to a deterioration in appearance of the disc cartridge.

In view of the foregoing, a disc cartridge which is constructed into such a three-piece structure as shown in FIG. 2 is proposed as disclosed in Japanese Patent Application Laid-Open Publication No. 78478/1989. More specifically, the disc cartridge generally designated at reference numeral 200 includes an upper plate 250, a lower plate 210, and a center frame 230 interposedly arranged between the upper plate 250 and the lower plate 210, resulting in exhibiting increased rigidity.

Thus, the conventional disc cartridge is constructed into a three-piece structure when it is required to exhibit increased rigidity and massive properties. Otherwise, it is constructed into a two-piece structure.

In the conventional disc cartridge 200 shown in FIG. 2, the center frame 230 is provided on a peripheral portion of each of upper and lower surfaces thereof with a stepped portion 231 of an L-shape in section, in which a side surface of each of the upper plate 250 and lower plate 210 is fitted, to thereby permit each of the upper and lower surfaces of the disc cartridge assembled to be flat. Unfortunately, such construction causes a boundary line between the center frame 230 and each of the upper and lower plates 250 and 210 to be formed on each of the upper and lower surfaces of the disc cartridge assembled. Such a boundary line causes a difference in level, often leading to a failure in smooth loading and unloading of the disc cartridge with respect to an information recording/reproducing apparatus.

In the conventional disc cartridge shown in FIG. 1, as described above, the labeling region to which a label is applied includes a mating line defined between the upper plate 150 and the lower plate 110 as well as the depressions 152 and 112 thereof, to thereby often fail to be flat and tend to be stepped. Formation of such a stepped portion leads to a failure in satisfactory labeling and causes a label adhered to the labeling region to be easily removed therefrom.

The disc cartridge of a three-piece structure shown in FIG. 2 eliminates the above-described problem relating to labeling; because the upper plate 250 and lower plate 210 are fitted at the outer periphery thereof in the stepped portions 231 formed on the inner periphery of the upper and lower surfaces of the center frame 230, to thereby render a side surface of the disc cartridge 200 free from any mating line. Instead, such construction of the disc cartridge causes a mating line between the center frame 230 and the plates to be defined in proximity to an outer edge of the upper and lower surfaces of the disc cartridge. This often fails in proper positioning of the disc cartridge in the information recording/reproducing apparatus and causes the disc cartridge to be caught in the apparatus.

In general, the upper and lower plates are made of polycarbonate (PC) resin, to thereby exhibit satisfactory sliding properties. However, the center frame is required to be made of a material increased in rigidity. This generally causes the center frame to be made of a material different from that of the upper and lower plates, resulting in the center frame being deteriorated in sliding properties depending on the material. When the center frame fails to exhibit satisfactory sliding properties, contacting of the shutter with at least a part of the center frame during sliding movement thereof causes the shutter to be deteriorated in operation. In order to improve a design or appearance of the disc cartridge, it is often practiced to make the upper and lower plates of a transparent material to permit the center frame to be externally visible and color the center frame by painting or plating. Contacting of the shutter with the center frame during the sliding movement causes a colored layer formed on the center frame to be peeled therefrom as well as the above-described deterioration in operation of the shutter.

In order to keep the shutter from being in contact with the center frame to eliminate the above-discussed problem, it would be considered that the center frame is formed into a substantially C-shape, resulting in being excluded or removed from a location in proximity to a region of sliding of the shutter. However, this fails to increase rigidity of the center frame.

Such exclusion of the center frame from the region of sliding of the shutter reduces strength of the upper and lower plates, leading to cracking or breakage of the disc cartridge, because a portion of each of the upper and lower plates positioned on an outside of the opening and in proximity to the region of sliding of the shutter cannot be formed into a sufficient thickness. Likewise, this causes occurrence of an interstice, resulting in dust possibly entering the disc cartridge through the interstice.

In the disc cartridge 200 shown in FIG. 2, an attempt to provide the upper plate 250 with a gate for molding as in the disc cartridge 100 of FIG. 1 would be considered. Such an attempt requires to provide a projection-like basin on an inner surface of the upper plate positionally corresponding to the gate. This requires that the center frame 230 is provided with a depression or recess in order to prevent any interference between the basin and the center frame. Unfortunately, such a recess of the center frame is externally observed or visible, leading to a deterioration in appearance of the disc cartridge and a reduction in commercial value thereof, when the upper plate 250 is made of a transparent or semitransparent material.

In general, assembling of a disc cartridge or tape cartridge into a completed product is carried out by integrally joining two synthetic members such as upper and lower casing or plate members to each other using any suitable fastening or fixing means. In this instance, it is proposed that the casing members are provided on an outer surface thereof with rough ruggedness and fine ruggedness, to thereby prevent the cartridge from dropping from the hand by mistake or provide the cartridge with a stereoscopic feeling due to irregular reflection of light thereon, as disclosed in Japanese Utility Model Publication No. 4469/1994. Also, it is proposed that the casing members each are formed on the outer surface thereof with ruggedness which permits incident light to be reflected thereon in various directions, to thereby keep an inside of the cartridge out of sight or permit the cartridge to optically exhibit a rainbow phenomenon, leading to an increase in commercial value of the cartridge, as disclosed in Japanese Utility Model Application Laid-Open Publication No. 156070/1986.

The conventional cartridge thus formed thereon with ruggedness fails to exhibit such intended or expected advantages of the ruggedness as described above when it is dropped or rubbed by mistake during loading/unloading thereof or handling thereof. Also, the ruggedness causes an inside of the cartridge to be out of sight although it is made of a material transparent sufficiently to permit the inside to be externally visible. Further, when the ruggedness is undesirably formed into a lens-like configuration, the inside is caused to be distortedly visible.

SUMMARY OF THE INVENTION

The present invention has been made in view of the foregoing disadvantages of the prior art.

Accordingly, it is an object of the present invention to provide a disc cartridge which is capable of being kept from being caught in an information recording/reproducing apparatus during loading/unloading thereof with respect to the apparatus while being constructed into a three-piece structure.

It is another object of the present invention to provide a disc cartridge which is capable of ensuring satisfactory application of a label to a side surface thereof while being constructed into a three-piece structure.

It is a further object of the present invention to provide a disc cartridge which is capable of preventing a shutter from being in contact with a center frame to ensure safe operation of a shutter and exhibiting sufficient strength while being constructed into a three-piece structure.

It is still another object of the present invention to provide a disc cartridge which is capable of providing an upper plate with a gate to ensure satisfactory molding thereof without providing a center frame with any depression or recess while being constructed into a three-piece structure.

It is yet another object of the present invention to provide a disc cartridge which is capable of preventing damage to an outer surface thereof, appropriately exhibiting a stereoscopic feeling and a rainbow phenomenon and exhibiting a variation in color of the outer surface thereof, to thereby substantially increase a commercial value of the cartridge and exhibit an improved appearance thereof over a prolonged period of time.

In accordance with the present invention, a disc cartridge is provided. The disc cartridge includes an upper plate, a lower plate, and a center frame arranged between the upper plate and the lower plate which are joined to each other to form a casing in which a disc-like medium is received. The upper plate defines the whole upper surface region of the disc cartridge and the lower plate defines the whole lower surface region of the disc cartridge. Also, the disc cartridge includes an engaged structure in which an engagement structure of an information recording/reproducing apparatus is engagedly fitted. The engaged structure is constituted by only the lower plate.

In a preferred embodiment of the present invention, the engaged structure includes reference holes in each of which a respective pin of the information recording/reproducing apparatus is engagedly fitted. The reference holes are each provided on an outer periphery thereof with an annular projection in a manner to project toward the center frame.

In a preferred embodiment of the present invention, the engaged structure includes reference holes in each of which a respective pin of the information recording/reproducing apparatus is engagedly fitted. The center frame is formed at a portion thereof corresponding to the reference holes with relief holes each having a size greater than a corresponding one of the reference holes.

In a preferred embodiment of the present invention, the reference holes each are provided on an outer periphery thereof with an annular projection in a manner to project toward the center frame.

In a preferred embodiment of the present invention, the engaged structure includes notches engaged with disc cartridge drawing-in sections of the information recording/reproducing apparatus. The notches are each constituted by a side wall section mounted on the lower plate in a manner to extend therefrom and a top wall section connected to the side wall section.

Thus, in the present invention, the whole upper and lower surfaces of the disc cartridge and the engaged structure of the disc cartridge in which the engagement structure of the information recording/reproducing apparatus is engagedly fitted are constituted by only the upper and lower plates, resulting in being free from any boundary line between the upper plate or lower plate and the center frame. This effectively prevents the disc cartridge from being caught in the apparatus during loading/unloading of the disc cartridge with respect to the apparatus.

In a preferred embodiment of the present invention, the center frame is provided on a side surface thereof with a labeling region, which is provided on upper and lower edges thereof with projections extending upwardly and downwardly therefrom, respectively. The upper and lower plates are formed so as to provide an outer configuration of the disc cartridge and an overall size of the disc cartridge and are each provided on an end surface portion of an inner surface thereof with a stepped portion engaged with a corresponding one of the projections.

In a preferred embodiment of the present invention, the center frame is so formed that the side surface on which the labeling region is arranged is recessed inwardly from side surfaces of the upper and lower plates by a distance corresponding to a thickness of a label. Thus, when a label is applied to the labeling region, a surface of the label is substantially flush with a side surface of the upper and lower plates.

In a preferred embodiment of the present invention, the upper plate and lower plate are formed with openings which permit a recording/reproducing head of the information recording/reproducing apparatus to be inserted into the disc cartridge therethrough. The disc cartridge also includes a shutter slidably mounted on the upper and lower plates in a manner to straddle the upper and lower plates so that the openings are selectively closed with the shutter. The lower plate is provided on a lower surface thereof with a groove of a U-shape in section in a manner to be positioned in proximity to an outer edge thereof on which the shutter is slid and in a manner to extend along the outer edge. The lower plate is provided on an upper surface thereof with a projection-like shutter slide guide in a manner to be positioned in proximity to the outer edge and extend along the outer edge. The shutter includes a first engagement portion inserted into the groove of the lower plate and a second engagement portion inserted between the lower plate and the upper plate and slid on the shutter slide guide of the lower plate. The center frame is so formed that an end surface thereof facing the shutter is positioned inwardly of the shutter slide guide, resulting in being kept from being contacted with the shutter.

In the embodiment, the first engagement of the shutter is engaged with the groove of the lower plate and the second engagement is slid on the shutter guide section of the lower plate. Also, the end surface of the center frame is positioned inwardly of the shutter slide guide of the lower plate. Thus, the shutter is slid on the lower plate and upper plate while being kept from being in contact with the center frame.

In a preferred embodiment of the present invention, an outer edge of the center frame is provided with a first projection in a manner to project toward the shutter. The lower plate is provided on an inner periphery of the opening thereof with a stepped portion engaged with the first projection. The upper plate is provided on an inner periphery thereof of the opening thereof with a second projection in a manner to project toward the center frame, to thereby be abutted against an upper surface of the center frame. Such construction ensures that a region the disc cartridge outside the openings exhibits sufficient strength.

In a preferred embodiment of the present invention, the upper plate and lower plate are provided with mating sections, respectively. The mating sections are formed with stepped portions of an L-shape in section engaged with each other, respectively. This permits the mating sections of the upper and lower plates to be intimately engaged with each other through the steps.

In a preferred embodiment of the present invention, the upper plate and lower plate are formed with openings through which a recording/reproducing head of the information recording/reproducing apparatus is inserted into the disc cartridge. The upper plate and lower plate have a shutter slidably mounted thereon in a manner to straddle the upper plate and lower plate. The upper and lower plates are each provided thereon with a shutter slide section reduced in thickness on which the shutter is slid. The upper plate is made of a transparent or semi-transparent material. The upper plate has a gate for molding thereof arranged at a region of the outer surface thereof other than the shutter slide section. Also, the upper plate is provided around a portion of an inner surface thereof corresponding to the gate with a thickness reduced region. Such construction eliminates a necessity of providing a basin at a position on the inner surface of the upper plate corresponding to the gate, to thereby ensure a good appearance of the disc cartridge. Also, arrangement of the thickness reduced region permits the upper plate to be molded with increased balance and dimensional accuracy.

In a preferred embodiment of the present invention, the disc cartridge also includes a shutter lock arranged for keeping the shutter closed. The center frame is provided with a shutter lock receiving section for receiving the shutter lock therein. The gate of the upper plate is positioned above the shutter lock receiving section.

In a preferred embodiment of the present invention, the thickness reduced region is formed with an outer configuration coincident with that of the receiving section of the center frame.

In a preferred embodiment of the present invention, the disc cartridge also includes an erasure preventing plug. The lower plate is provided on an edge thereof with a plug mounting section in which the erasure preventing plug is arranged. The center frame is formed with a cutout so as to surround the plug mounting section. The gate of the upper plate is positioned above the plug mounting section.

In a preferred embodiment of the present invention, the thickness reduced region is formed into an outer configuration coincident with that of the plug mounting section.

In a preferred embodiment of the present invention, at least one of the upper plate and lower plate is formed on an outer surface thereof with an ultraviolet-cured layer cured by an ultraviolet curing treatment.

In a preferred embodiment of the present invention, the one plate is subjected to the ultraviolet curing treatment using an acrylic ultraviolet-cured paint.

In a preferred embodiment of the present invention, the one plate is made of a transparent or semi-transparent resin material and subjected to a mirror finish which permits an interior of the disc cartridge to be visible through the one plate.

In a preferred embodiment of the present invention, the upper plate and lower plate are formed with head insertion holes and have a shutter mounted thereon so as to selectively close said head insertion holes. The upper plate and lower plate are each provided on a region thereof other than a region thereof covered with the shutter with an ultraviolet-cured layer.

In a preferred embodiment of the present invention, the upper plate is formed with recess for providing a shutter slide region and a labeling area, respectively. The upper plate is provided on a region thereof other than the recess with an ultraviolet-cured layer.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
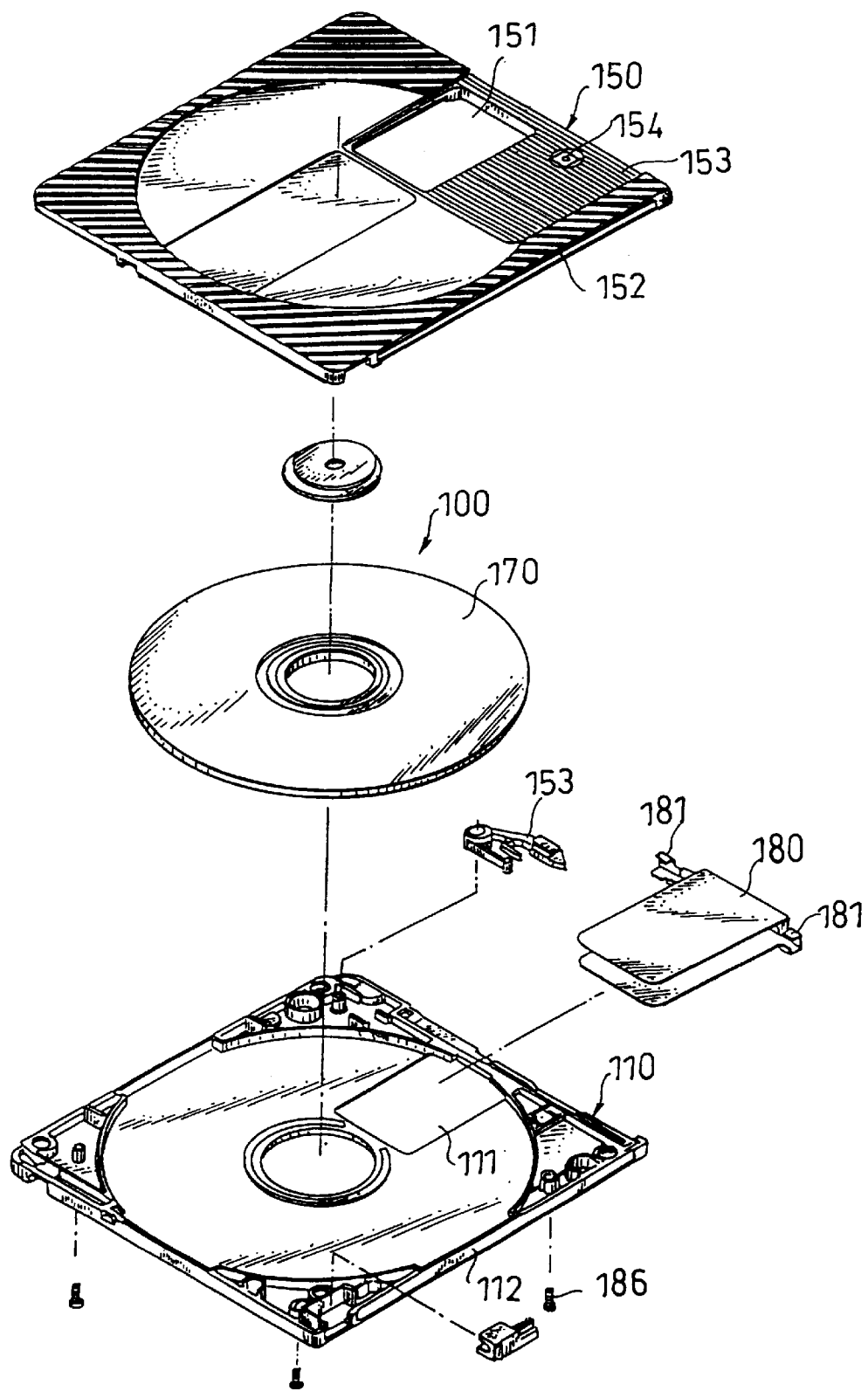
FIG. 1 is an exploded perspective view showing a conventional disc cartridge constructed into a two-piece structure.
Figure 2:
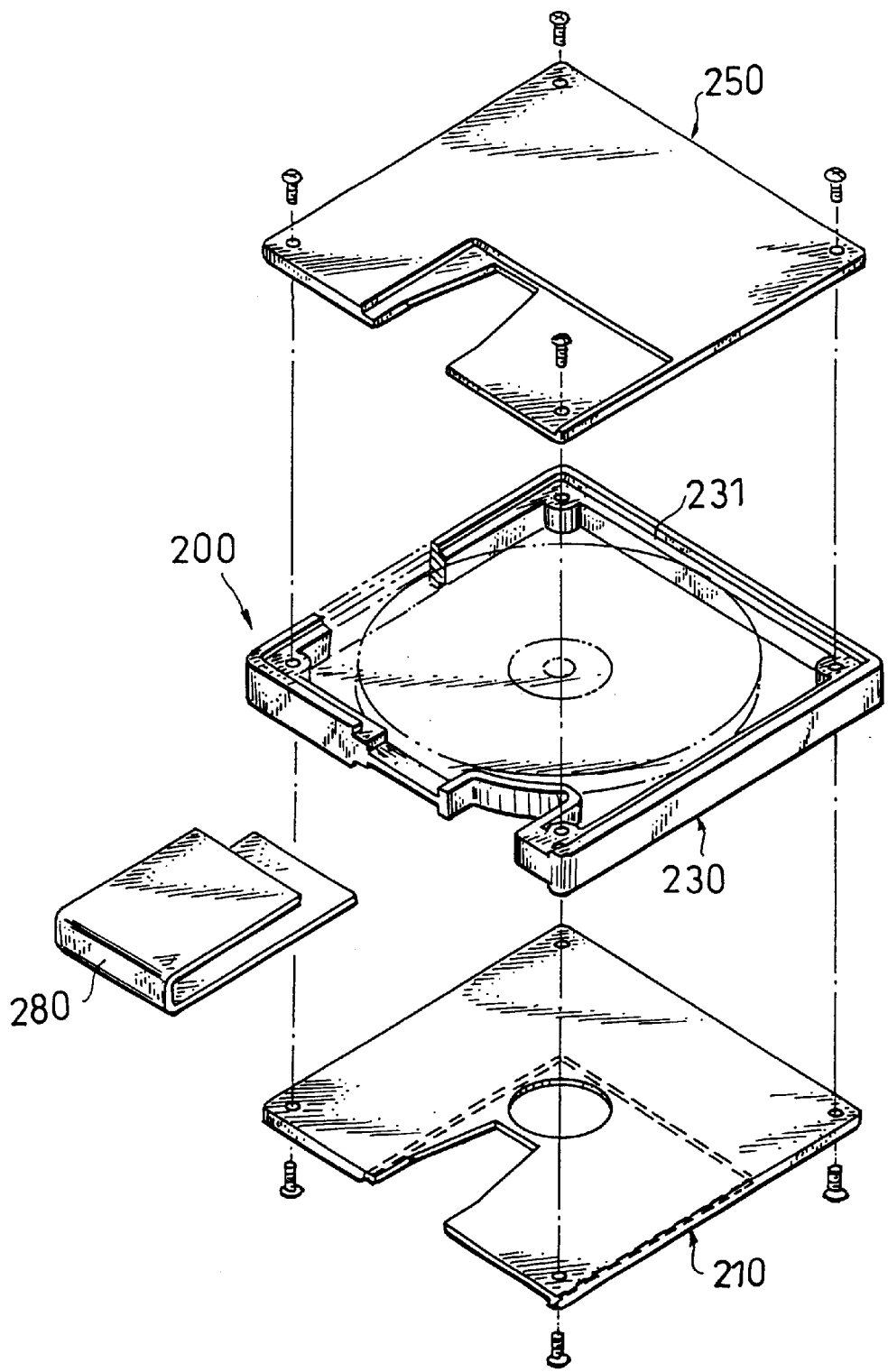
FIG. 2 is an exploded perspective view showing a conventional disc cartridge constructed into a three-piece structure.
Figure 3:
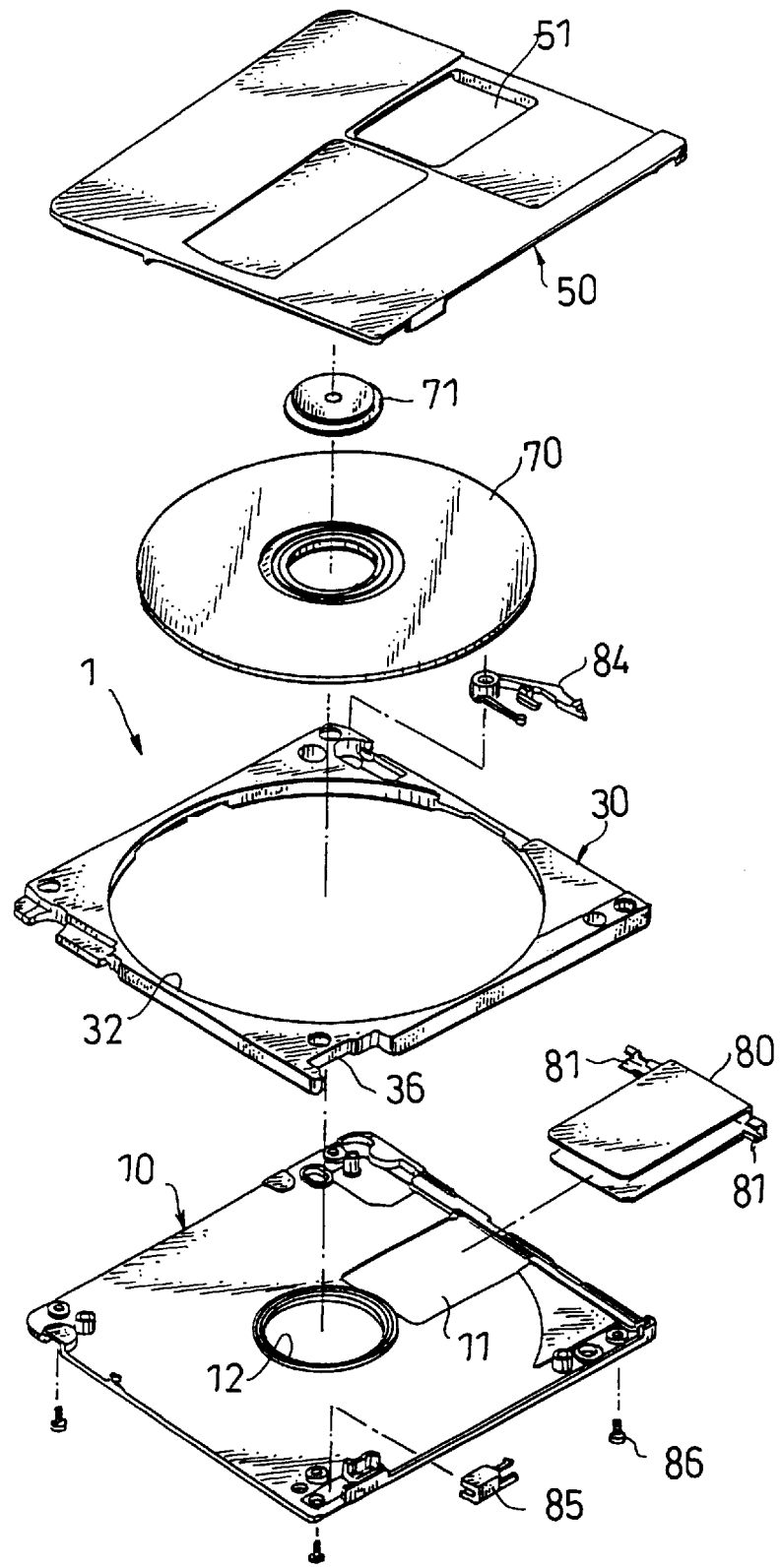
FIG. 3 is an exploded perspective view showing an embodiment of a disc cartridge according to the present invention.
Figure 4:
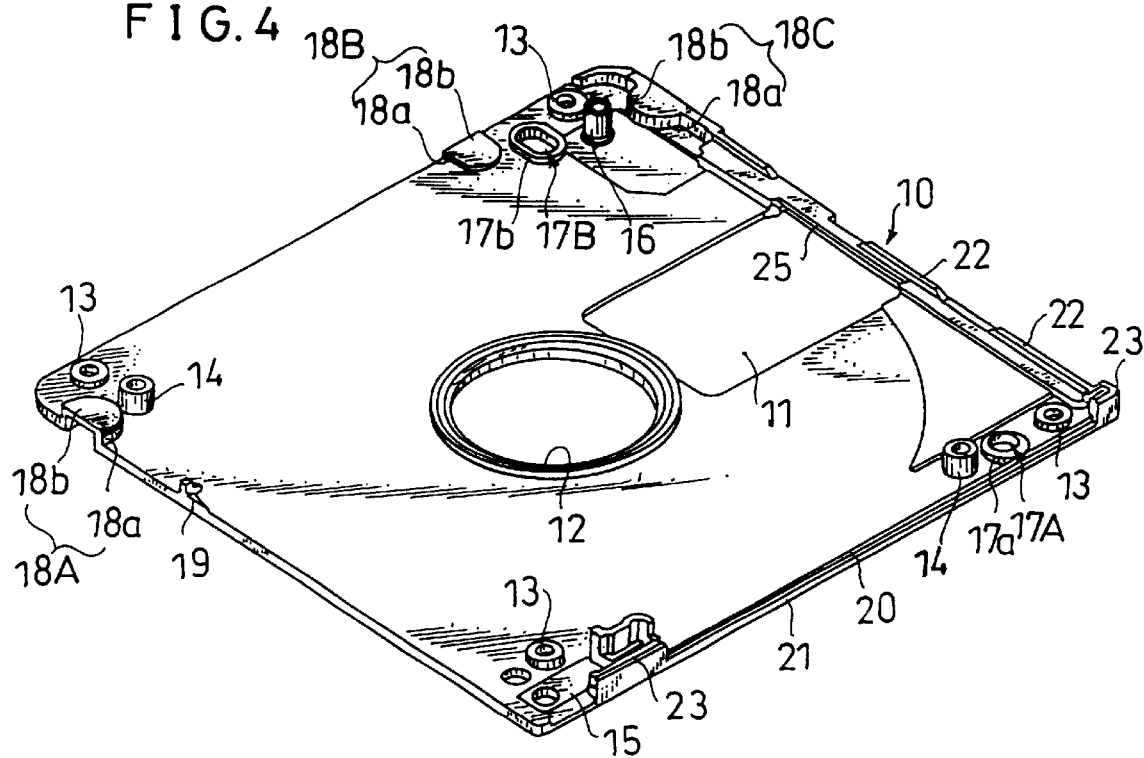
FIG. 4 is a perspective view showing a lower plate, wherein an inner or upper surface thereof is placed up.
Figure 5:
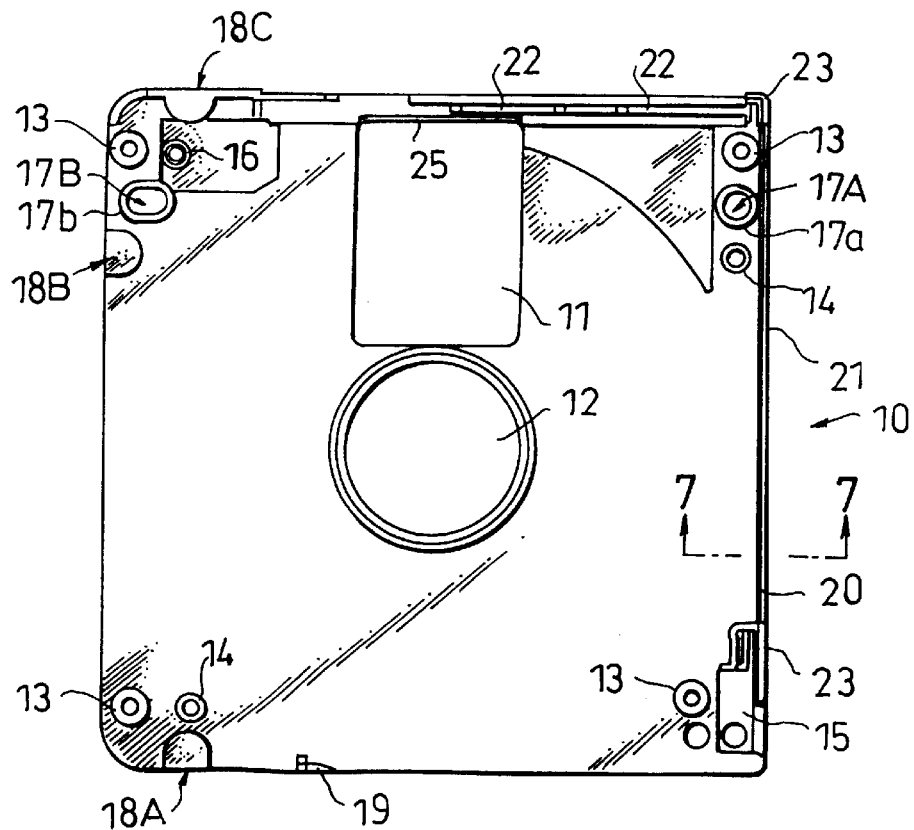
FIG. 5 is a plan view of the lower plate shown in FIG. 4.
Figure 6:
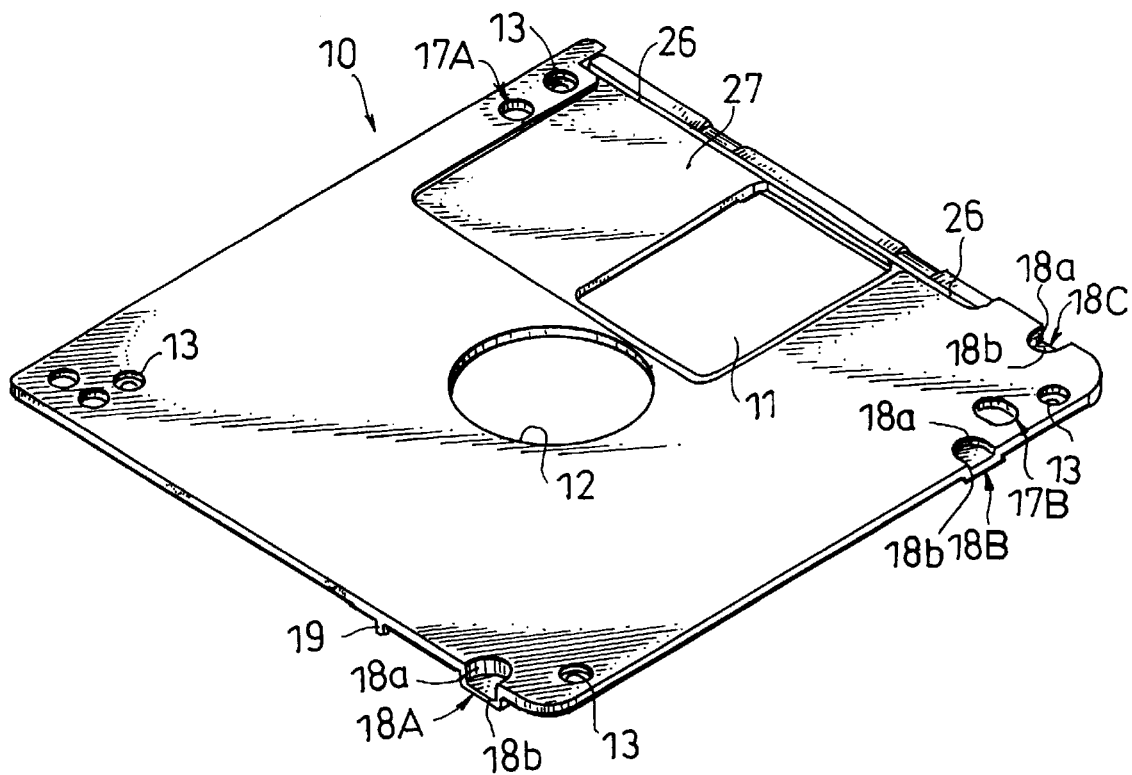
FIG. 6 is a perspective view of the lower plate shown in FIG. 4, wherein an outer or lower surface thereof is placed up.

Now, a disc cartridge according to the present invention will be described hereinafter with reference to FIGS. 3 to 34 wherein like reference numerals designate like or corresponding parts throughout.

Referring first to FIGS. 3 to 22, an embodiment of a disc cartridge according to the present invention is illustrated. A disc cartridge of the illustrated embodiment which is generally designated at reference numeral 1 is constructed in the form of an MD in which an optical disc is incorporated. More specifically, the disc cartridge is constructed into a three-piece structure and includes an upper plate 50 and a lower plate 10, which are joined to each other through a center frame 30 interposedly arranged between the upper plate 50 and the lower plate 10, to thereby provide a casing in which a disc-like medium 70 such as an optical disc is received.

The lower plate 10 and upper plate 50 are provided at a portion thereof in proximity to predetermined one of sides thereof with openings 11 and 51 for exposing a part of the disc-like medium 70 therethrough, respectively, as in the prior art. Also, the disc cartridge 1 includes a shutter 80 constructed in substantially the same manner as in the prior art, which is arranged in a manner to slidably straddle the upper and lower plates 50 and 11 to selectively close the openings 11 and 51. The lower plate 10 is formed at a substantially central portion thereof with an aperture 12 through which a hub 71 mounted on the disc-like medium 70 is exposed.

The lower plate 10 is mounted thereon with an erasure preventing plug 85 and then the center frame 30 and disc-like medium are arranged on the lower plate 10. Then, the center frame 30 is mounted therein with a shutter lock 84, followed by arrangement of the upper plate 50 on the center frame 30. Screws 86 are then upwardly threadedly inserted from a bottom of the lower plate 10 through the lower plate 10, center frame 30 and upper plate 50, resulting in the lower plate 10, center frame 30 and upper plate 50 being fastened together. Alternatively, joining between the lower plate 10 and the upper plate 50 may be attained by welding.

Now, the lower plate 10, center frame 30 and upper plate 50 will be more detailedly described hereinafter.

The lower plate 10 may be constructed as shown in FIGS. 4 to 7. The lower plate 10 is made of synthetic resin such as polycarbonate (PC) or the like and formed with a substantially plate-like shape. This is also true of the upper plate 50. Also, the lower plate 10 is formed with an overall size substantially identical with those of the center frame 30 and upper plate 50. The lower plate 10 and upper plate 50 each are formed with an outer configuration substantially identical with that of the disc cartridge 1.

The lower plate 10 is provided at a portion thereof in proximity to each of four corners thereof with a boss 13 for screwing in a manner to extend upwardly or toward the center frame 30 when assembling of the disc cartridge is carried out. The bosses 13 are each formed therein with a threaded through-hole. Also, the lower plate 10 is provided on a portion thereof in proximity to one of the corners thereof with a support boss 16 for supporting the shutter lock 84. Further, the plate 10 is provided on a portion thereof in proximity to another one of the corners thereof with a plug mounting section 15 for mounting the erasure preventing plug 85 therein.

Also, the lower plate 10 is formed with a reference hole 17A of a substantially circular shape, as well as a reference hole 17B of a substantially oval shape. The reference holes 17A and 17B are each adapted to act as a fit-on section which permits a reference pin P (FIG. 18) acting as a fit-in section of the information recording/reproducing apparatus to be engagedly fitted, resulting in positioning the disc cartridge 1 in the information recording/reproducing apparatus when the former is loaded in the latter. The reference holes 17A and 17B are each provided on an outer periphery thereof with an annular projection 17a, 17b in a manner to extend in a circumferential direction thereof and project upwardly or toward the center frame 30. The circumferential projections 17a and 17b have an inner peripheral surface aligned with that of a corresponding one of the reference holes 17A and 17B.

Further, the lower plate 10 is provided at an edge of three sides thereof with notches 18A to 18C, respectively. The notches 18A to 18C are each adapted to be engaged with a cartridge drawing-in member (not shown) of the information recording/reproducing apparatus which acts to guide the disc cartridge to a predetermined position in the apparatus. Thus, the notches 18A to 18C each act as a fit-on section and the cartridge drawing-in member acts as a fit-in section. The notches 18A to 18C are each formed with a substantially semicircular or semi-oval shape and arranged so as to project toward the center frame 30. Thus, the notches 18A to 18C each include a top wall section 18b formed with a substantially semi-circular or semi-oval shape in plan and a side wall section 18a arranged so as to connect an outer arcuate periphery of the top wall section 18b and the lower plate 10 to each other therethrough.

The lower plate 10 is provided on an outer edge of one side thereof on which the shutter 80 is fitted with a shutter slide guide 22 in a manner to project upwardly or toward the center frame 30. The shutter slide guide 22 has an upper surface acting as a slide surface for engagements 81 of the shutter 80.

In addition, the lower plate 10 is provided on a portion of an inner edge of the one side thereof defined in proximity to the shutter slide guide 22 and facing the opening 11 with a stepped portion 25. The stepped portion 25 is formed with a substantially L-shape in section by cutting away an annular projection of the inner edge. Also, the lower plate 10 is formed on a portion of a rear or outer surface thereof which is substantially positionally symmetric to the shutter slide guide 22 with a groove 26 of a U-shape in section in a manner to extend along an outer edge thereof, as-shown in FIGS. 20 and 21. The groove 26 is adapted to permit the engagements 81 of the shutter 80 to be fitted therein. The lower plate 10 is provided at a peripheral edge of one of the corners thereof with a mating section 23 in a manner to be in proximity to the plug mounting section 15 and upwardly project therefrom. The mating section 23 is adapted to be fittedly engaged with a mating section 57 (FIGS. 11 and 12) of the upper plate 50 when the lower plate 10 and upper plate 50 are aligned with each other while being superposed on each other.

Furthermore, the lower plate 10 is provided on a side thereof opposite to the side thereof on which the shutter 80 is slidably fitted with a projection 19 projecting upwardly or toward the center frame 30.

Figure 7:
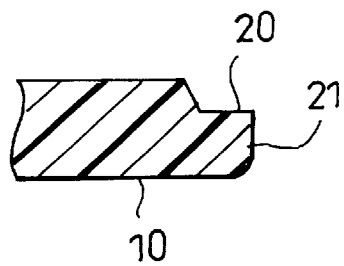
FIG. 7 is a fragmentary sectional view taken along line 7—7 of FIG. 5.

Moreover, the lower plate 10 is provided on a side thereof on which the plug mounting section 15 is arranged with a stepped portion 20 so as to extend over the whole side except a portion thereof at which the plug mounting section 15 is arranged. A region of the lower plate 10 in which the stepped portion 20 is arranged acts as a labeling region of the disc cartridge 1. The stepped portion 20, as shown in FIG. 7, is formed with a substantially L-shape by cutting away an annular projection of the side and inner surfaces of the lower plate 10, resulting in reduced in thickness.

The lower plate 10 is provided on the inner surface thereof with bosses 14, which are fitted in respective fitting holes 39 of the center frame 30 to position the center frame 30 with respect to the lower plate 10 when the center frame 30 is placed on the lower plate 10.

Figure 8:
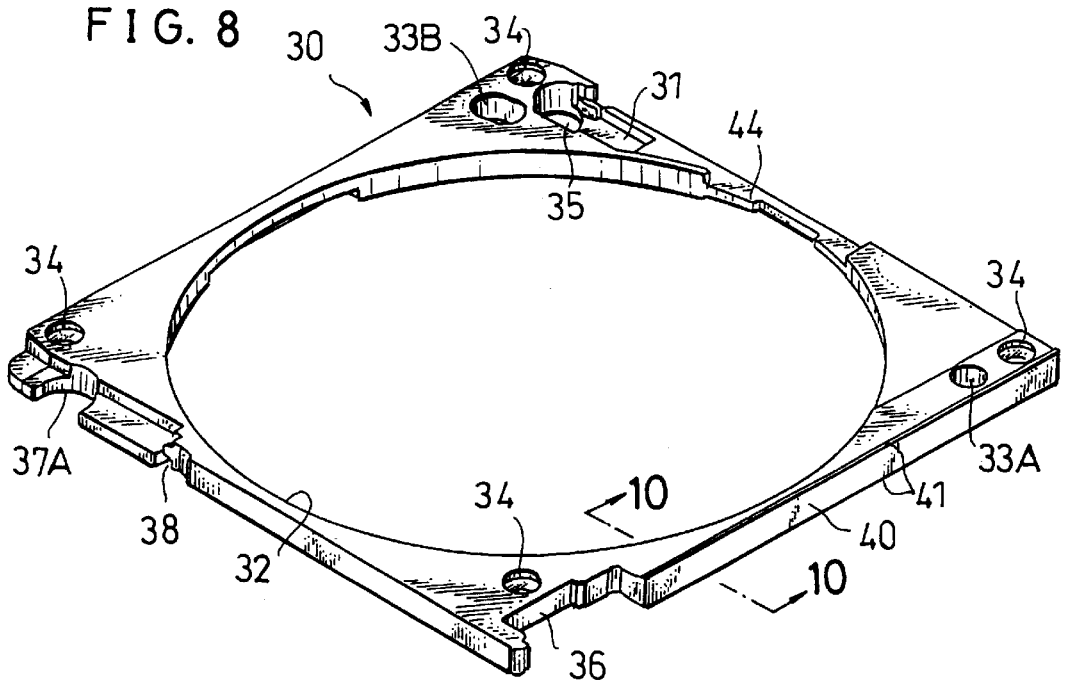
FIG. 8 is a perspective view showing a center frame, wherein an upper surface thereof or a surface thereof opposite to an upper plate is placed up.
Figure 9:
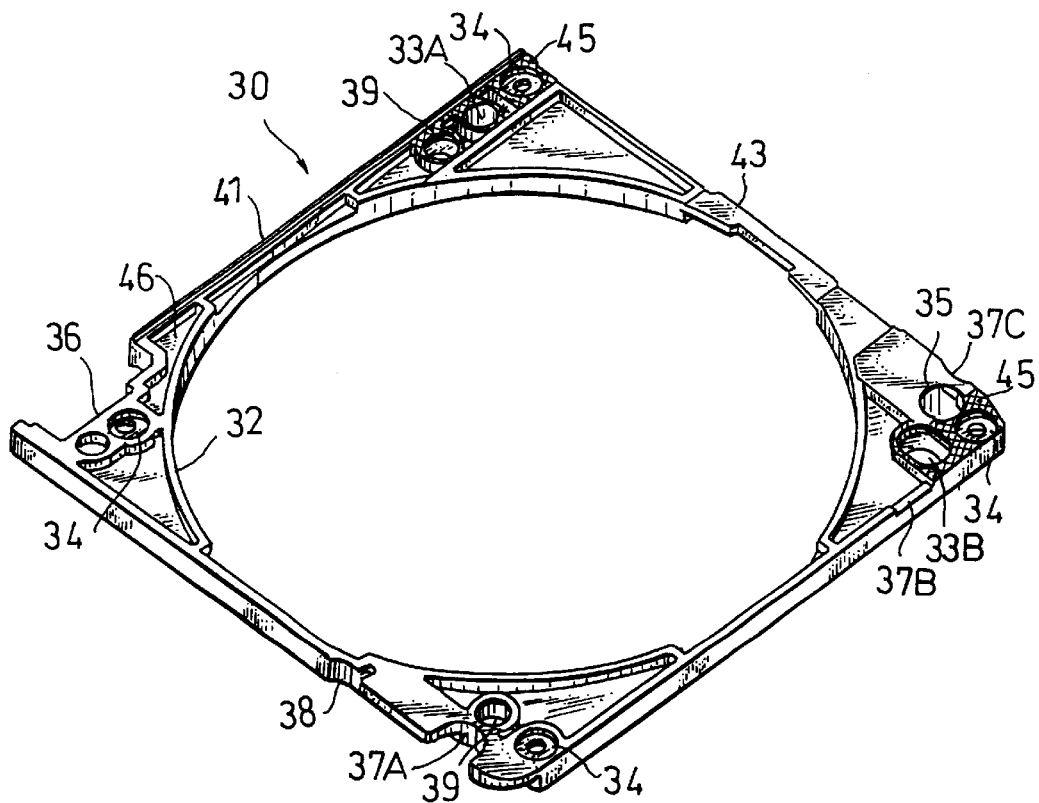
FIG. 9 is a perspective view of the center frame shown in FIG. 8, wherein a lower surface thereof or a surface thereof opposite to a lower plate is placed up.
Figure 10:
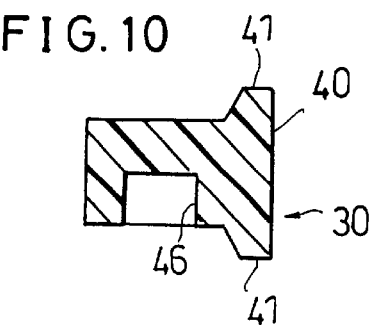
FIG. 10 is a fragmentary sectional view taken along line 10—10 of FIG. 8.
Figure 11:
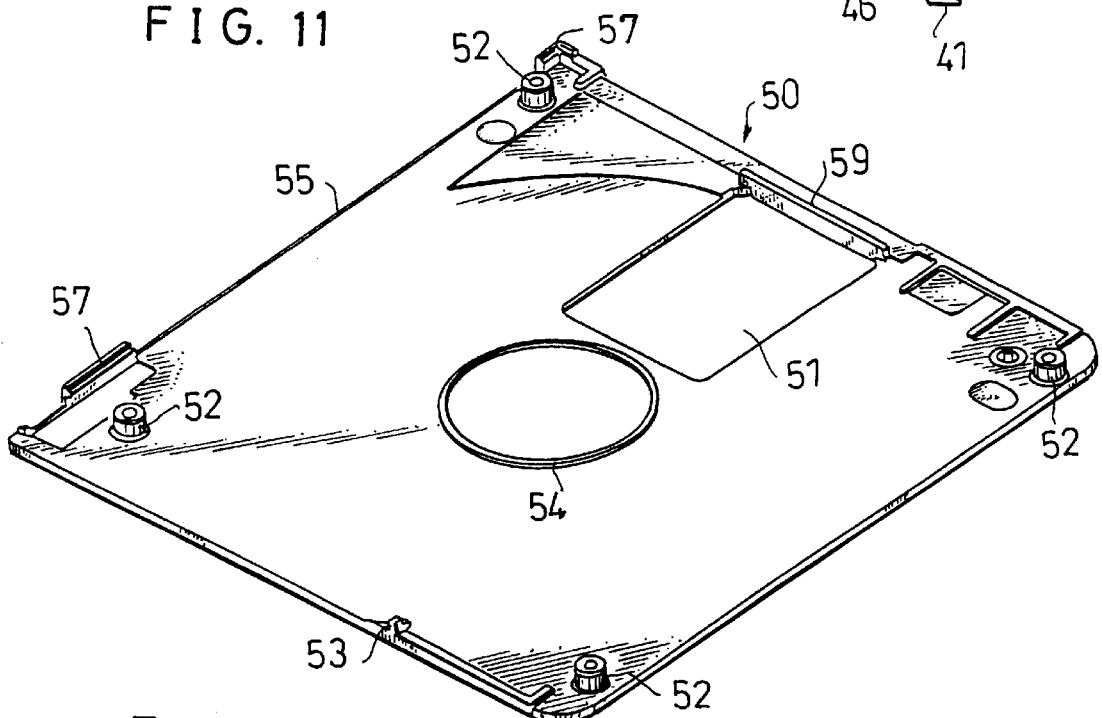
FIG. 11 is a perspective view showing an upper plate, wherein an inner or lower surface thereof is placed up.
Figure 12:
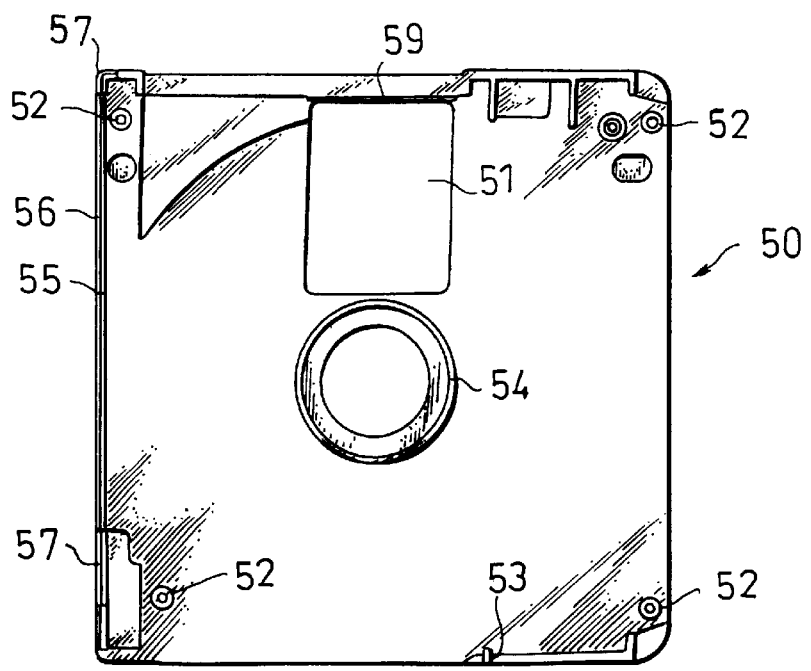
FIG. 12 is a plan view of the upper plate shown in FIG. 11.
Figure 13:
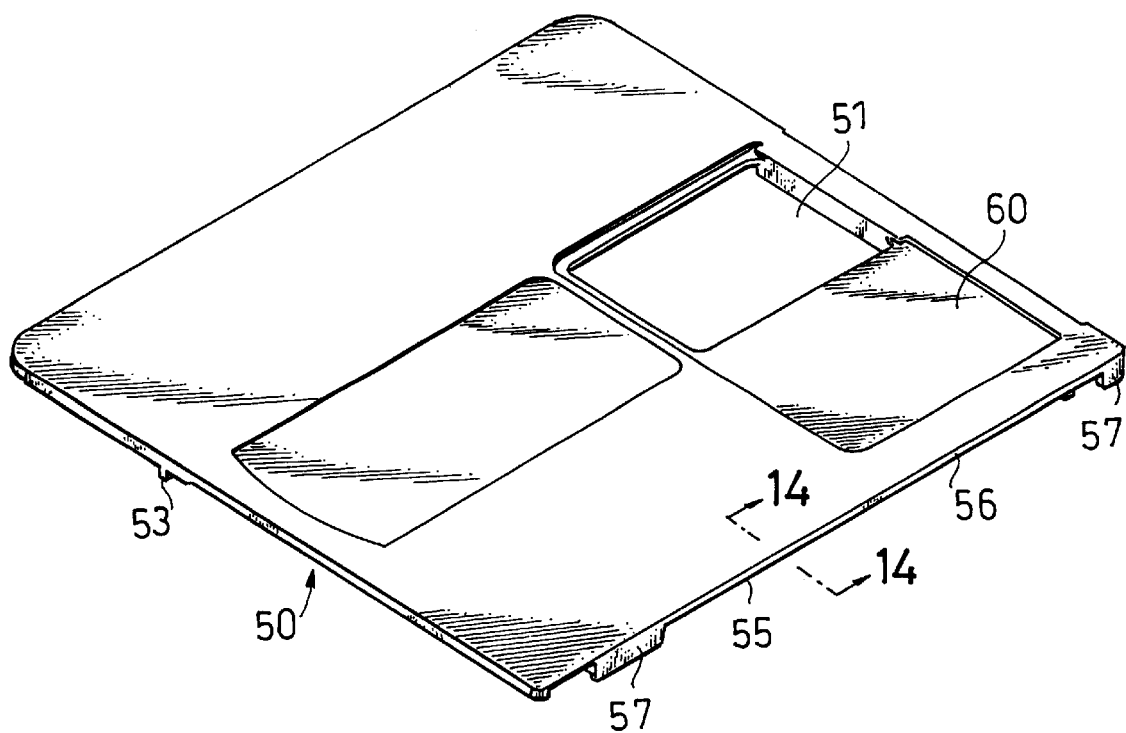
FIG. 13 is a perspective view of the upper plate shown in FIG. 11, wherein an outer or upper surface thereof is placed up.
Figure 14:
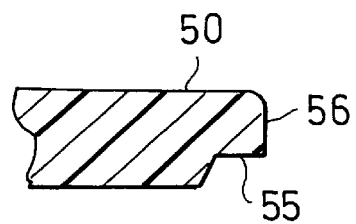
FIG. 14 is a fragmentary sectional view taken along line 14—14 of FIG. 13.

The center frame 30 is constructed as shown in FIGS. 8 and 9. The center frame is constructed so as to exhibit increased heat resistance and rigidity. For this purpose, the center frame 30 is made of a combination of acrylonitrile-butadiene-styrene copolymer (ABS) resin and polycarbonate (PC) resin or polyamide (PA) resin with various kinds of additives added thereto. The additives include tungsten, barium sulfate, iron, phosphor iron, ferrite, copper, zinc, lead and the like. The additives are preferably added in an amount of 5 to 50 wt %. Also, the center frame 30 may be subjected to a painting or coating treatment in order to improve an appearance thereof.

The center frame 30 is provided with a central hole 32 of a substantially circular shape in which the disc-like medium 70 is received, resulting in being formed into a frame-like structure. Thus, the center frame is free of any discontinuous portion as seen in a C-shape and the like, to thereby be significantly increased in rigidity. The center frame 30 is formed on a portion of each of four corners of an upper surface thereof with a fit-on section 34 of a U-shape in section in which bosses 52 provided on a lower surface of the upper plate 50 so as to act as a fit-in section each are engagedly fitted. Such fit-on sections 34 are likewise provided on a rear surface of the center frame 30, so that the bosses 13 of the lower plate 10 for screwing are fitted therein.

Also, the center frame 30 is provided on a portion of the upper surface thereof in proximity to one of corners thereof with a recessed receiving section 31 in which the shutter lock 84 is received. The shutter lock receiving section 31 is formed with a through-hole 35, through which the support boss 16 of the lower plate 10 is inserted to extend upwardly from the center frame 30 when the center frame 30 is arranged on the lower plate 10.

In addition, the center frame 30 is provided on a lower surface thereof with a projection or first projection 43, which is adapted to be engaged with the stepped portion 25 of the lower plate when the center frame 30 is mounted on the lower plate 10.

Further, the center frame 30 is formed on the lower surface thereof with relief holes 33A and 33B, which are arranged in a manner to be opposite to the reference holes 17A and 17B of the lower plate 10 when the center frame 30 is mounted on the lower plate 10. The relief holes 33A and 33B are formed with a size slightly greater than that of the reference holes 17A and 17B of the lower plate 10.

The center frame 30 is provided at a portion thereof in proximity to a corner thereof diagonally opposite to the shutter lock receiving section 31 with a cutout 36, which is formed by cutting out a part of the center frame 30 into a substantially U-shape. The cutout 36 acts to eliminate interference between the center frame 30 and the plug mounting section 15 of the lower plate 10 when the center frame 30 is mounted on the lower plate 10. Such arrangement of the cutout 36 while leaving the corner prevents a deterioration in appearance of the disc cartridge due to the cutout 35. Likewise, the center frame 30 is formed with a cutout 38 which prevents interference between the center frame 30 and the projection 19 of the lower plate 10.

Further, the center frame 30 is formed with cutouts 37A to 37C at portions thereof positionally corresponding to the notches 18A to 18C of the lower plate 10 when the center frame 30 is mounted on the lower plate 10, leading to engagement between the notches 18A to 18C and the cutouts 37A to 37C.

The center frame 30, as shown in FIG. 8, is provided on the side thereof on which the cutout 36 is formed with a labeling region 40 of the disc cartridge, which is formed so as to extend over the whole side except the cutout 36. Also, the center frame 30 is provided with projections 41, which are arranged on upper and lower edges of the labeling region 40 so as to extend toward the upper plate 50 and lower plate 10, respectively. The lower projection 41 is fitted in the stepped portion 20 of the lower plate 10 and formed with a height substantially equal to a depth of the stepped portion 20 of the lower plate 10. The center frame 30 is provided on the lower surface thereof with recesses 46, which acts to render a thickness of a peripheral wall of the center frame 30 substantially uniform.

The upper plate 50 is constructed in such a manner as shown in FIGS. 11 to 14. The upper plate 50, as described above, is formed with the opening 51 through which the disc-like medium 70 is partially exposed. Also, as briefly described above, the upper plate 50 is provided on a portion thereof in proximity to each of four corners thereof with the boss 52 which is engagedly fitted in a corresponding one of the fit-on sections 34 of the center frame 30. The upper plate 50 is provided on a central portion of an inner surface thereof with an annular rib 54, which acts to regulate movement of the hub 71 of the disc-like medium 70.

The upper plate 50 includes a thickness-reduced region 60 including the opening 51, over which the shutter 80 is slid. Also, the upper plate 50 is formed with a stepped portion 55 on an end surface of a side thereof opposite to the side of the lower plate on which the stepped portion 20 is provided. The stepped portion 55 is formed with a shape symmetric to the stepped portion 20 of the lower plate 10 and provided so as to extend over a region corresponding to the labeling region 40 of the center frame 30.

Also, the upper plate 50 is provided on an edge of a front side thereof facing the opening 51 with a rib-like projection or second projection 59 in a manner to project inwardly or toward the center frame 30. The second projection 59 is abutted against a surface portion 44 (FIG. 8) of the upper surface of the center frame 30. Further, the upper plate 50 is provided on a portion of the inner surface thereof opposite to the mating section 23 of the inner surface of the lower plate 30 with a mating section 57. In addition, the upper plate 50 is provided on an edge of a rear side thereof opposite to the front side thereof with a projection 53. The projection 53 is arranged in a manner to be opposite to the projection 19 of the lower plate 10 when the upper plate 50 is joined to the lower plate 10 through the center frame 30 interposed therebetween.

Figure 15:
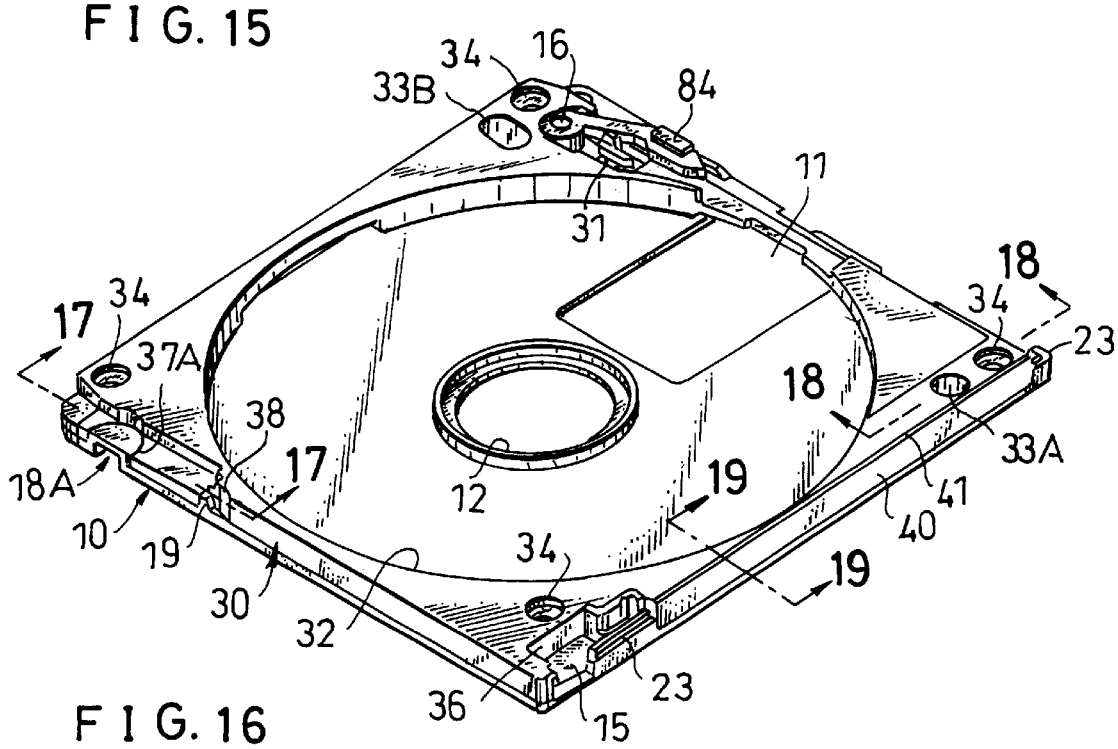
FIG. 15 is a perspective view showing arrangement of a center frame on a lower plate.
Figure 16:
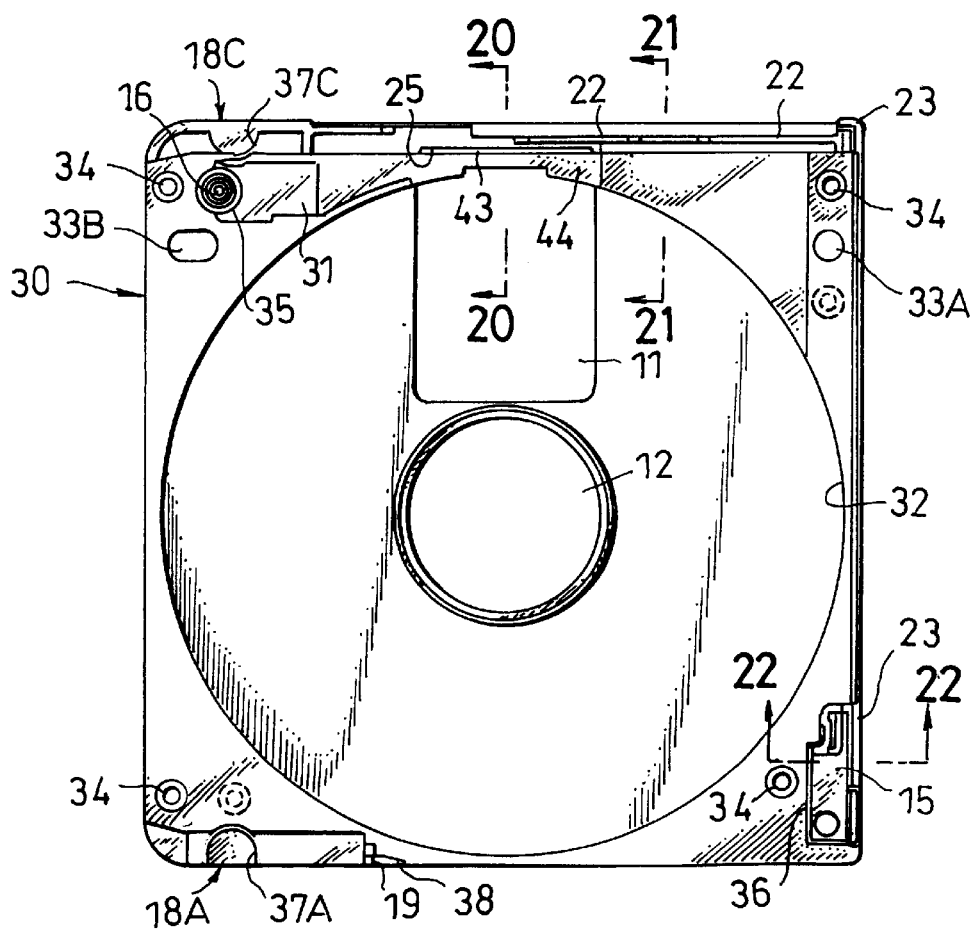
FIG. 16 is a plan view of the arrangement shown in FIG. 15.

FIGS. 15 and 16 show the center frame 30 mounted on the lower plate 10. Mounting of the center frame 30 on the lower plate 10 permits the bosses 13 of the lower plate 10 for screwing to be fitted in the fit-on sections 34 of the center frame 30 and the support boss 16 of the lower plate 10 to be inserted via the through-hole 35 of the center frame 30, resulting in being projected upwardly from the center frame 30. Also, the shutter lock 82 is received in the shutter lock receiving section 31 of the center frame 30 while being supported on the support boss 16.

Also, the plug mounting section 15 of the lower plate 10 is arranged in the cutout 36 of the center frame 30. Further, the notches 18A to 18C of the lower plate 10 are fitted in the cutouts 37A to 37C. In addition, the projection 19 of the lower plate 10 is fitted in the cutout 38 of the center frame 30.

Figure 17:
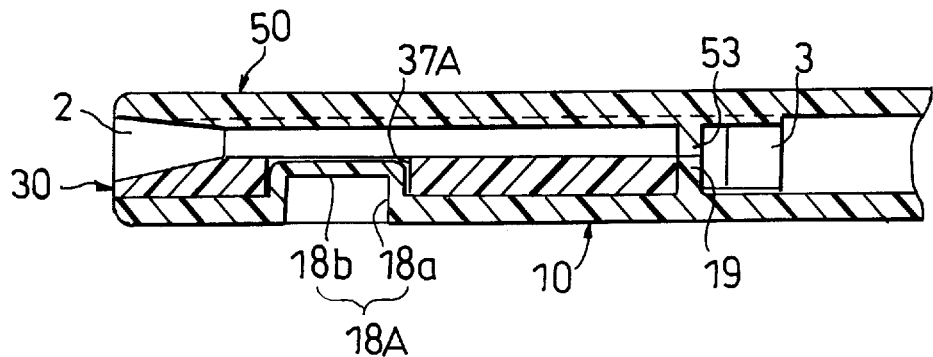
FIG. 17 is a sectional view showing a combination of a lower plate, a center frame and an upper plate fittedly combined with each other, which corresponds to a section taken along line 17—17 of FIG. 15.
Figure 18:
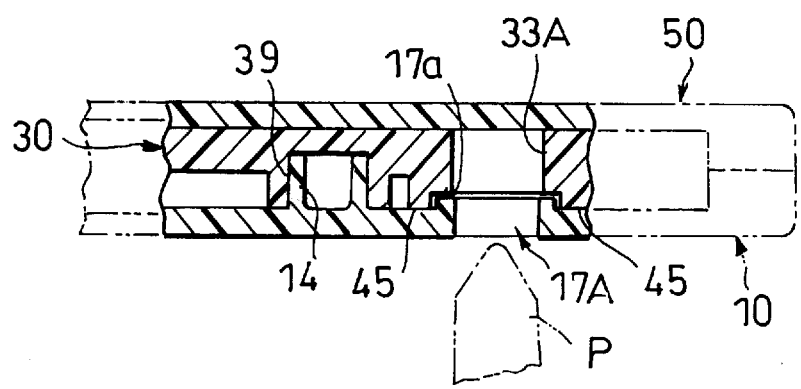
FIG. 18 is a sectional view showing a combination of a lower plate, a center frame and an upper plate fittedly combined with each other, which corresponds to a section taken along line 18—18 of FIG. 15.

Mounting of the upper plate 50 on the center frame 30 thus mounted on the lower plate 10 is carried out in such a manner as shown in FIGS. 17 and 18. More particularly, fitting between the lower plate 10 and the upper plate 50 permits the projection 19 of the lower plate 10 to be abutted against the projection 53 of the upper plate 50. Also, the center frame 30 and upper plate 50 cooperate with each other to provided a guide groove 2 which is engaged with a member of the information recording/reproducing apparatus. At this time, the projections 19 and 53 cooperate to each other to constitute a wall defining an inner end of the guide groove 2 as shown in FIG. 17. Also, the wall thus provided by the projections 19 and 53 defines an end of a rear hole or recess 3.

Further, the reference hole 17A of the lower plate 10, as shown in FIG. 18, is positioned opposite to the relief hole 33A of the center frame 30. Likewise, the reference 17B is positioned opposite to the relief hole 33B of the center frame 30, although this is not seen in FIG. 18. The relief hole 33A is formed at a peripheral portion of a lower surface thereof facing the lower plate 10 into a U-shape in section, into which the annular projection 17a of the reference hole 17A is inserted. In this instance, an upper surface of the annular projection 17a is kept from being abutted against the U-shaped peripheral portion of the relief hole 33A, resulting in a gap of a slight distance being defined therebetween. Also, the center frame 30 is provided with an abutment region 45, as designated by cross-hatching in FIG. 9. The abutment region 45 is arranged outside the U-shaped peripheral portion of the relief hole 33A and abutted against the inner or upper surface of the lower plate 10. Such arrangement of the abutment region 45 effectively prevents formation of a gap between the center frame 30 and the lower plate 10.

In FIG. 17, the notch 18A permits the disc cartridge drawing-in member of the information recording/reproducing apparatus to be fitted therein as described above. The notch 18A is arranged only at the lower plate 10, so that engagement and disengagement of the disc cartridge with respect to the notch 18A may be smoothly attained.

In FIG. 18, when the reference pin P of the information recording/reproducing apparatus is fitted in the reference hole 17A of the lower plate 10, a cylindrical portion of the reference pin P other than a pointed distal end thereof is engaged with the reference hole 17A. In this instance, the reference pin P is engaged with only the reference hole 17A while being kept from being engaged with the relief hole 33A, although the distal end of the reference pin P slightly enters the relief hole 33A.

The relief hole 33A of the center frame 30 is formed with a size greater than that of the reference hole 17A of the lower plate 10, to thereby ensure smooth fitting between the relief hole 33A and the reference hole 17A even when positional relationship therebetween is somewhat deviated. This is also true of the reference hole 17B.

Figure 19:
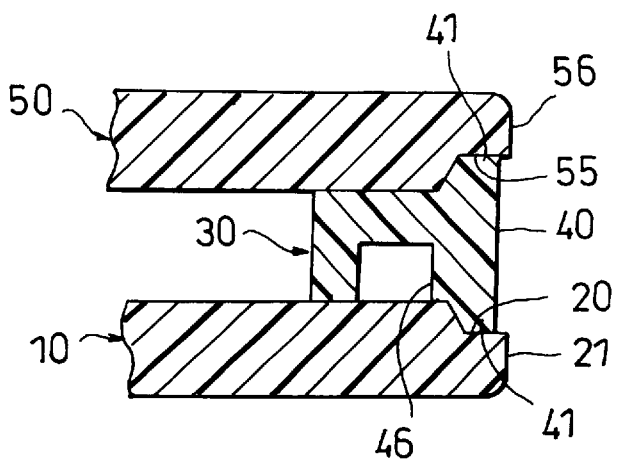
FIG. 19 is a sectional view showing a combination of a lower plate, a center frame and an upper plate fittedly combined with each other, which corresponds to a section taken along line 19—19 of FIG. 15.

Mutual fitting among the upper plate 50, center frame 30 and lower plate 10 in the labeling region 40 takes place as shown in FIGS. 15 and 19. Thus, when the upper plate 50 and lower plate 10 are joined to each other through the center frame 30 interposedly arranged therebetween, the projections 41 are each fitted between the stepped portion 20 of the lower plate 10 and the stepped portion 55 of the upper plate 50 in the labeling region 40 of the center frame 30. The labeling region 40 of disc cartridge 1 is free of any mating line between the upper plate 50 and the lower plate 10, resulting in labeling being effectively attained on the region 40. Also, arrangement of the projections 41 permits a width of the labeling region 40 to be maximum within a thickness of the disc cartridge 1.

Figure 20:
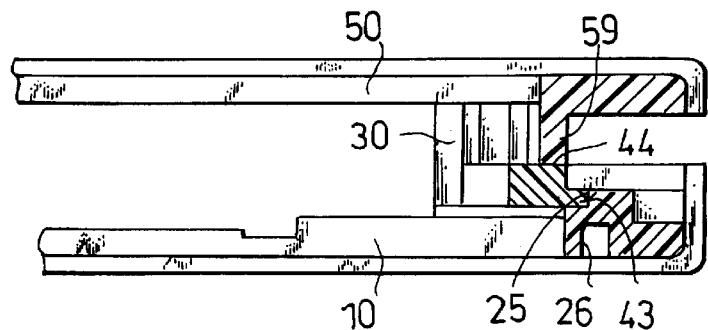
FIG. 20 is a sectional view showing a combination of a lower plate, a center frame and an upper plate fittedly combined with each other, which corresponds to a section taken along line 20—20 of FIG. 16.

Further, the labeling region 40 is formed so as to be depressed or recessed by an amount corresponding to a thickness of a label from a side surface 21 of the lower plate 10 and a side surface 56 of the upper plate 50. This permits a surface of the label to be flush with the side surfaces 21 and 56 of the lower and upper plates 10 and 50, to thereby ensure secure application of the label. In the illustrated embodiment, the labeling region 40 is arranged on only one side of the disc cartridge 1. Instead, two or more such sides of the disc cartridge 1 may each be provided thereon with such a labeling region. Also, as shown in FIG. 20, the projection 43 of the center frame 30 is fittedly engaged with the stepped portion 25 of the lower plate 10 and the rib-like projection 59 of the upper plate 50 is abutted against the surface portion 44 of the upper surface of the center frame 30.

Thus, the portion of each of the lower plate 10 and upper plate 50 defining a corresponding one of the openings 11 and 51 is hard to deflect and exhibits sufficient rigidity although the portion is reduced in sectional area as compared with the remaining portion, because coupling between the lower plate 10 and the center frame 30 and that between the center frame 30 and the upper plate 50 are carried out as described above. Also, a portion of the center frame 30 at which the projection 43 is provided is increased in sectional area due to the projection 43 although it inherently fails to increase a thickness thereof.

This permits the portion to be increased in rigidity and moldability. Also, such construction prevents any gap from being formed on a side surface of the above-described portion facing the shutter 88, to thereby effectively prevent intrusion of dust therethrough into the disc cartridge 1.

Figure 21:
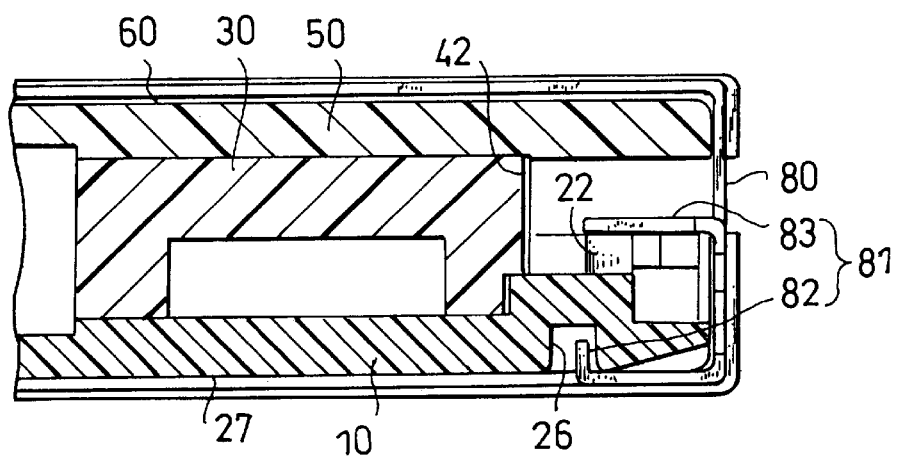
FIG. 21 is a sectional view showing a combination of a lower plate, a center frame and an upper plate fittedly combined with each other, which corresponds to a section taken along line 21—21 of FIG. 16.

The engagements 81 of the shutter 80, as shown in FIG. 21, are each formed with a substantially U-shape in section. Each of the engagements 81 includes a first engagement portion 82 inserted into a groove 26 of the lower plate 10 from the lower side of the lower plate 10. Also, it includes a second engagement portion 83 inserted between the lower plate 10 and the upper plate 50 and abutted against an upper surface of the shutter slide guide 22 of the lower plate 10, to thereby be slid on the upper surface.

The center frame 30 has an end surface 42 arranged so as to face the shutter 80 and positioned inwardly from the shutter slide guide 22 of the lower plate 10. This prevents the frame 30 from being contacted with the shutter 80 and keeps the shutter 80 contacted with only the lower plate 10 and upper plate 50, resulting in ensuring smooth operation of the shutter 80.

Figure 22:
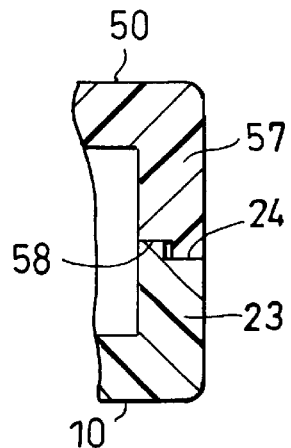
FIG. 22 is a sectional view showing a combination of a lower plate, a center frame and an upper plate fittedly combined with each other, which corresponds to a section taken along line 22—22 of FIG. 16.
Figure 23:
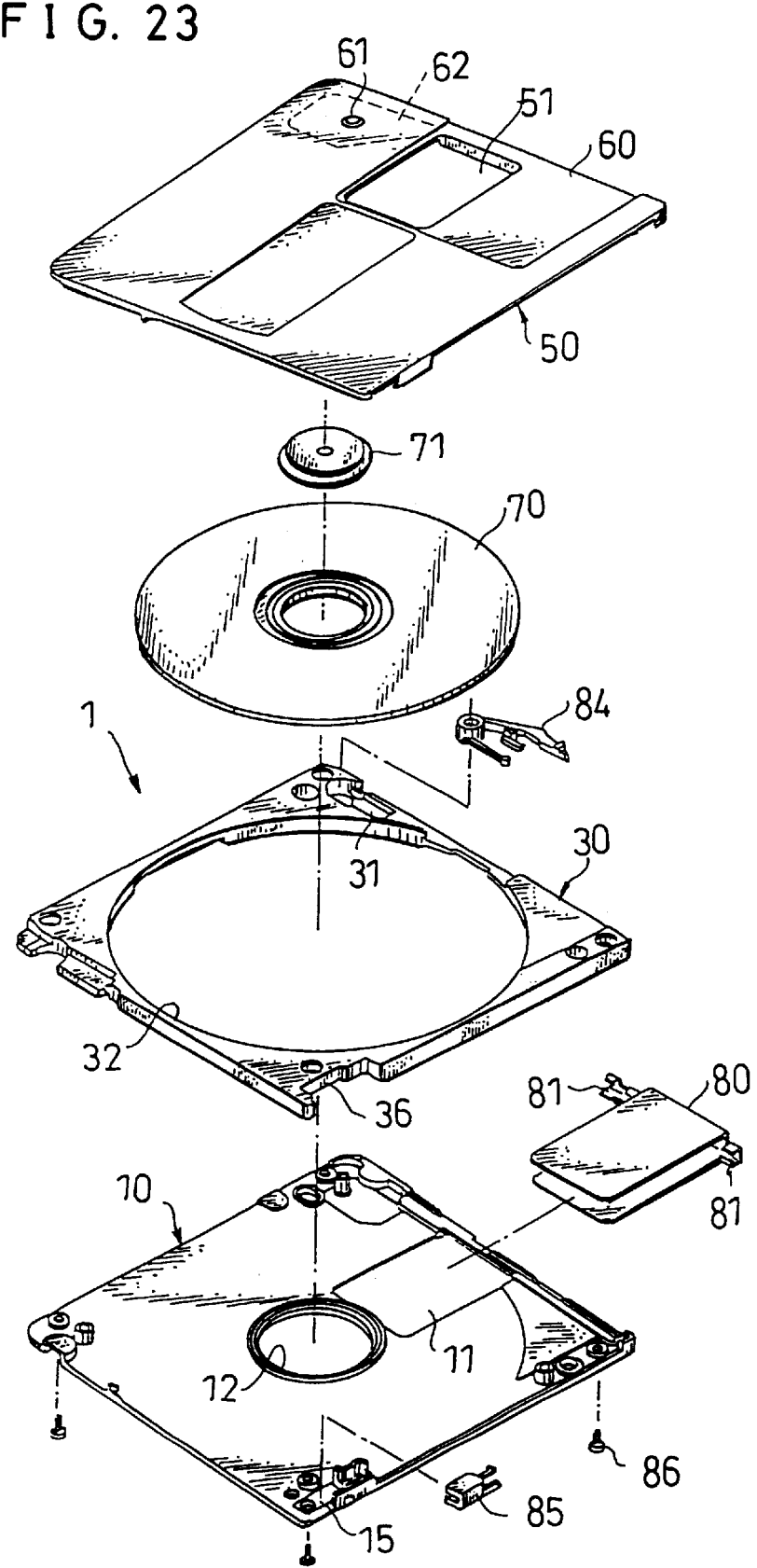
FIG. 23 is an exploded perspective view showing another embodiment of a disc cartridge according to the present invention.
Figure 24:
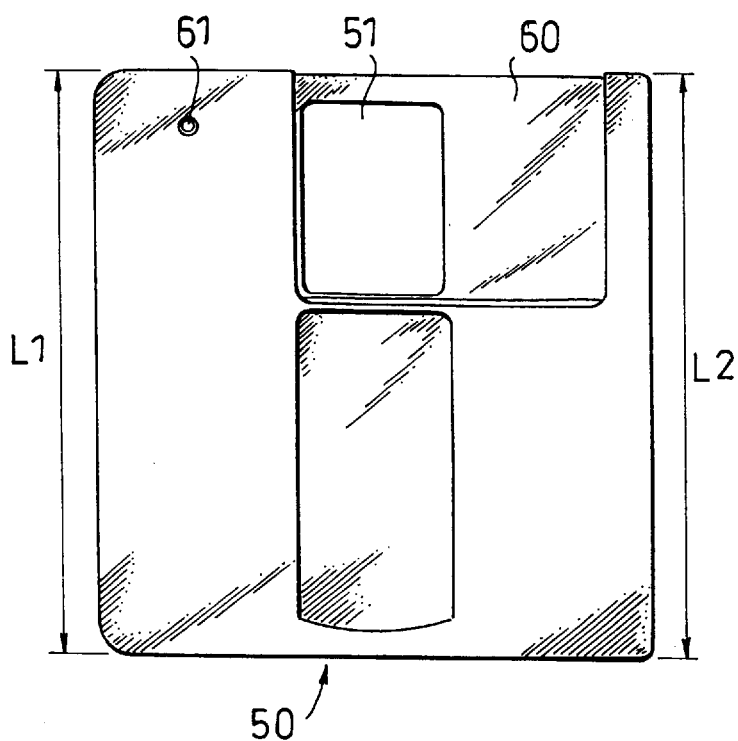
FIG. 24 is a plan view showing an upper plate.
Figure 25:
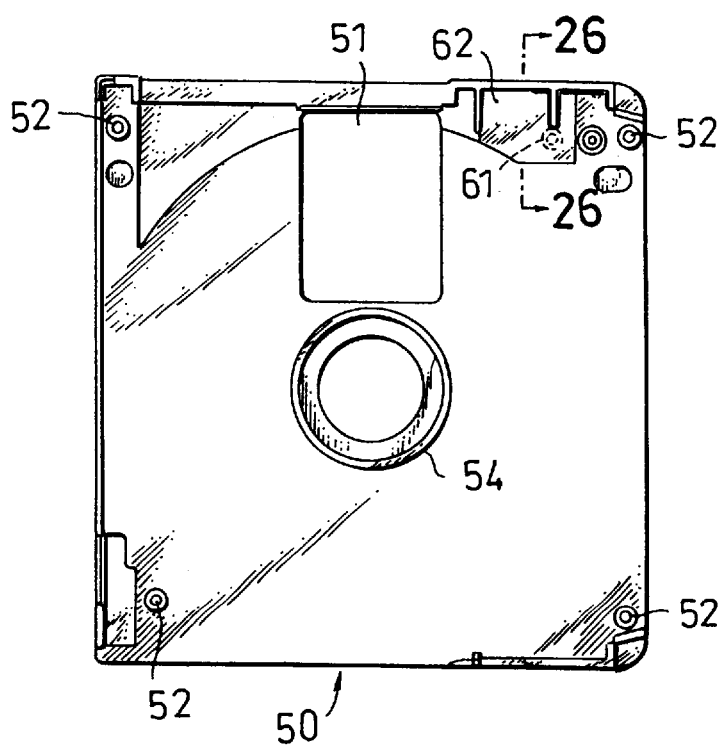
FIG. 25 is a plan view of the upper plate shown in FIG. 24, wherein an inner or lower surface thereof is placed up.
Figure 26:
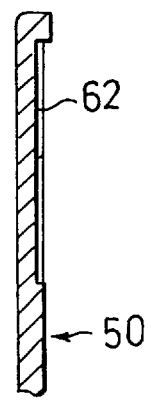
FIG. 26 is a fragmentary sectional view taken along line 26—26 of FIG. 25.

Mating between the mating section 23 of the lower plate 10 and the mating section 57 of the upper plate 50 is carried out as shown in FIG. 22. The mating sections 23 and 57 are formed on an upper surface thereof with stepped portions 24 and 58 of an L-shape in section 24 and 58, respectively, which are engaged with each other. Such construction effectively prevents formation of any gap between the mating sections 23 and 57.

The embodiment has been described in connection with the MD wherein the optical disc is used as the disc-like medium 70. It is a matter of course that the illustrated embodiment may be applied to an FD or the like in which a magnetic disc or the like other than an optical disc is used as a disc-like medium. Also, the top wall section 18b of each of the notches 18A to 18C is formed integrally with the lower plate 10. Instead, it may be formed on the center frame 30. Nevertheless, it is preferable that formation of the side wall section 18a and top wall section 18b in a manner to be integral with the lower plate 10 as in the illustrated embodiment permits each of the notches 18A to 18C to be increased in strength. Further, the projections 19 and 53 are respectively arranged on the lower plate 10 and upper plate 50. Alternatively, the projections may be provided on the center frame 30. Nevertheless, preferably the projections are provided on the lower and upper plates in view of strength thereof, because they are reduced in thickness. In addition, the annular projection 17a is arranged on the periphery of the hole or fit-on section 17A of the lower plate 10. When the lower plate 10 may be significantly increased in thickness, arrangement of the annular projection 17a may be eliminated. For example, when the reference pin P is inserted in a depth of 1.2 mm into the disc cartridge 1 and the lower plate 10 has a thickness of 1.0 mm, it is required to arrange the annular projection 17a of about 0.3 mm in height around the reference hole 17A. However, formation of the lower plate 10 with a thickness of 1.3 mm eliminates a necessity of arrangement of the annular projection 17a.

Referring now to FIGS. 23 to 26, another embodiment of a disc cartridge according to the present invention is illustrated. In a disc cartridge of the illustrated embodiment, an upper plate 50 and a lower plate 10 each are made of a transparent or a semi-transparent material so as to permit a disc-like cartridge received in the disc cartridge to be externally visible therethrough. The upper plate 50 is formed with an opening 51 through which the disc-like medium 70 is partially exposed.

The upper plate 50 is formed thereon with a shutter slide section 56 including the opening 51. The shutter slide section 56 is reduced in thickness, so that the upper plate 50 and a shutter 80 may be substantially flush with each other when the shutter 80 is mounted on the upper plate 50. Such construction is also true of the lower plate 10.

Also, the upper plate 50 is provided on a region thereof other than a shutter slide region 60 with a gate 61 for molding. Thus, the thickness reduced section or region is free from the gate 61, so that it is not required to provide a projection-like basin on a portion of an inner surface of the upper plate positionally corresponding to the gate 61. This eliminates a necessity of providing the center frame 30 with any portion of a U-shape in section for the purpose of providing the basin and preventing interference between the center frame 30 and the upper plate 50. This prevents a deterioration in appearance of the center frame 30 when the upper plate 50 is made of a transparent or semi-transparent material.

Also, the upper plate 50 is formed on a portion of an inner surface thereof positionally corresponding to the gate 61 with a thickness reduced region 62 which is reduced in thickness as compared with the remaining portion thereof. Now, the reason why the thickness reduced region 62 is provided will be described hereinafter.

When the gate 61 is arranged at such a position as shown in FIGS. 23 to 26, a length L1 of the upper plate 50 on a side of the gate 61 is caused to be greater than that L2 on a side opposite thereto. This is due to the fact that the upper plate 50 has a uniform thickness on the gate side or length L1 side, whereas it has a non-uniform thickness on the length L2 side because the shutter slide section 56 deteriorates flowability of resin during molding. Thus, the upper plate is formed at the region around the gate 61 into a reduced thickness, to thereby balance flowability of resin. The thickness reduced region 62 is formed with substantially the same thickness as the shutter slide section 56.

The thickness reduced region 62 may be formed with any desired configuration. However, positioning of the thickness reduced region 62 above a shutter lock receiving section 31 renders the thickness reduced region 62 inconspicuous, resulting in the disc cartridge being improved in appearance. In particular, the illustrated embodiment is constructed so as to render an outer configuration of the thickness reduced region 62 and that of the shutter lock receiving section 31 coincident with each other. This renders the thickness reduced region 62 more inconspicuous.

Figure 27:
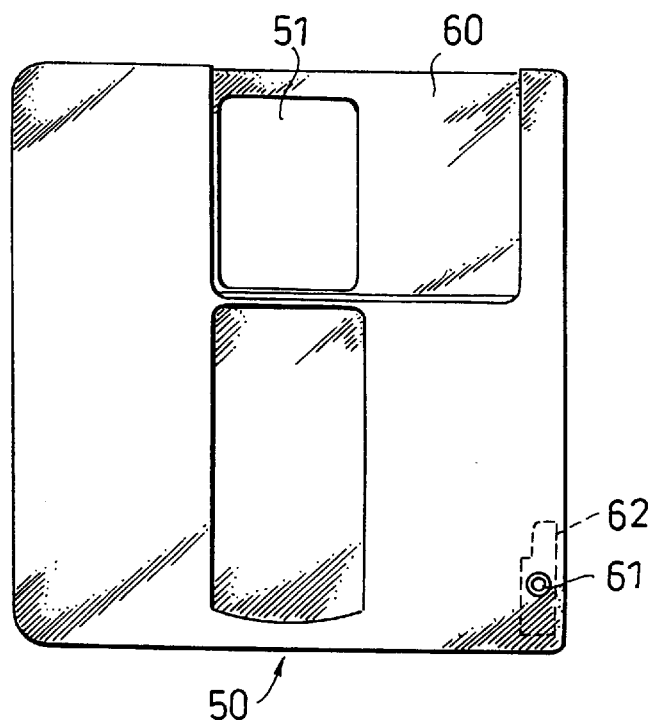
FIG. 27 is a plan view showing a modification of the upper plate shown in FIG. 24.
Figure 28:
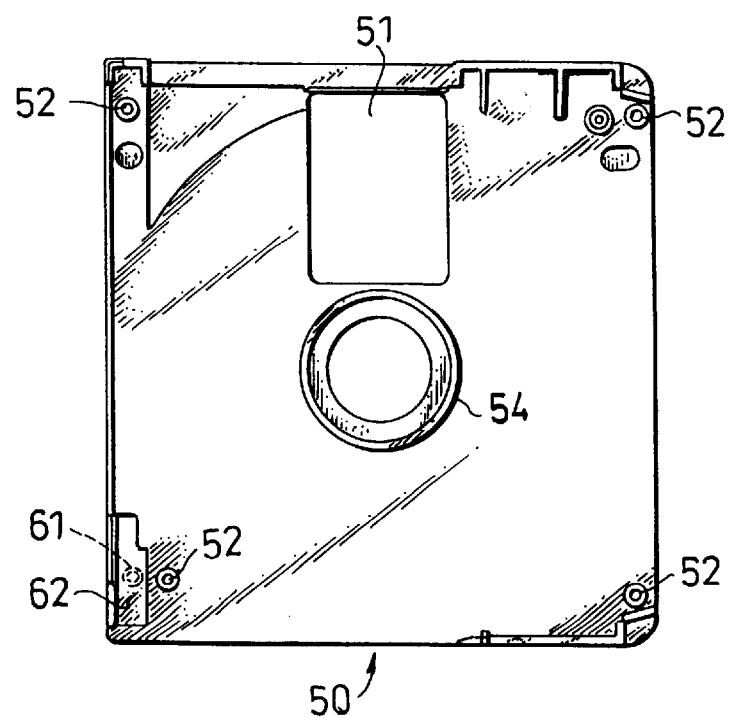
FIG. 28 is a plan view of the upper plate shown in FIG. 27, wherein inner or lower surface thereof is placed up.
Figure 29:
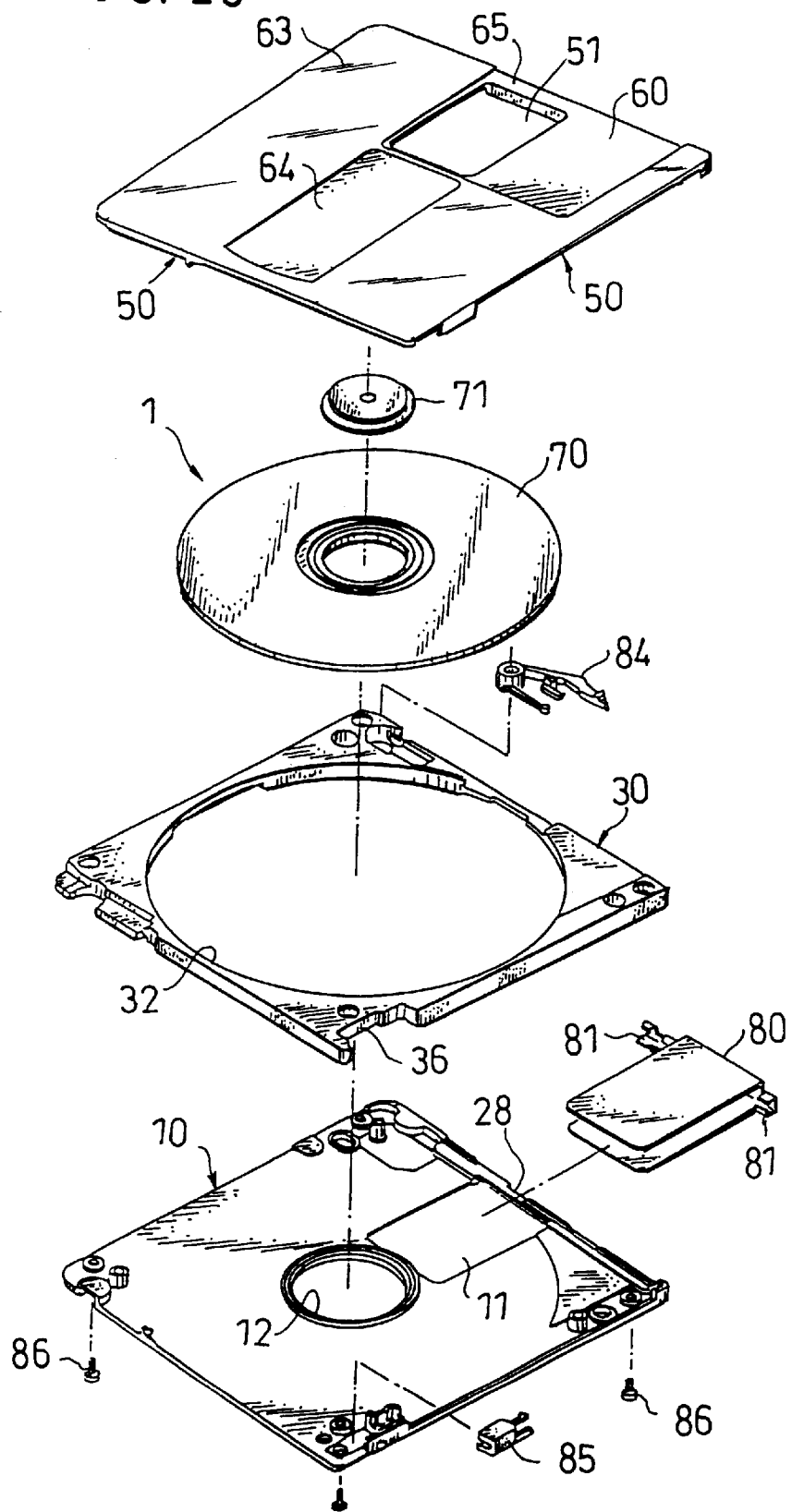
FIG. 29 is an exploded perspective view showing a further embodiment of a disc cartridge according to the present invention.
Figure 30:
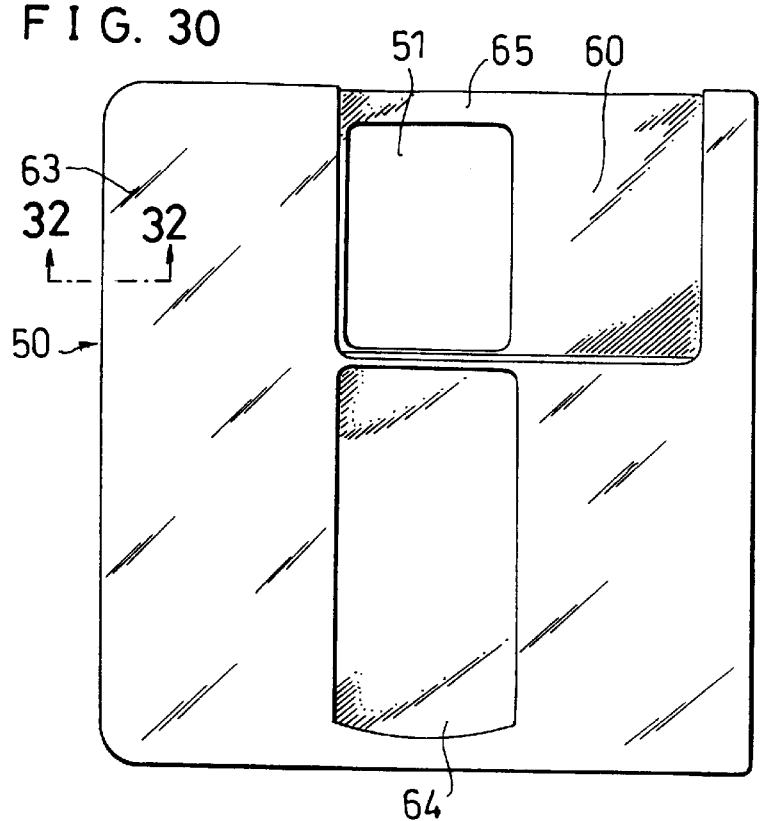
FIG. 30 is a plan view showing an upper plate.
Figure 31:
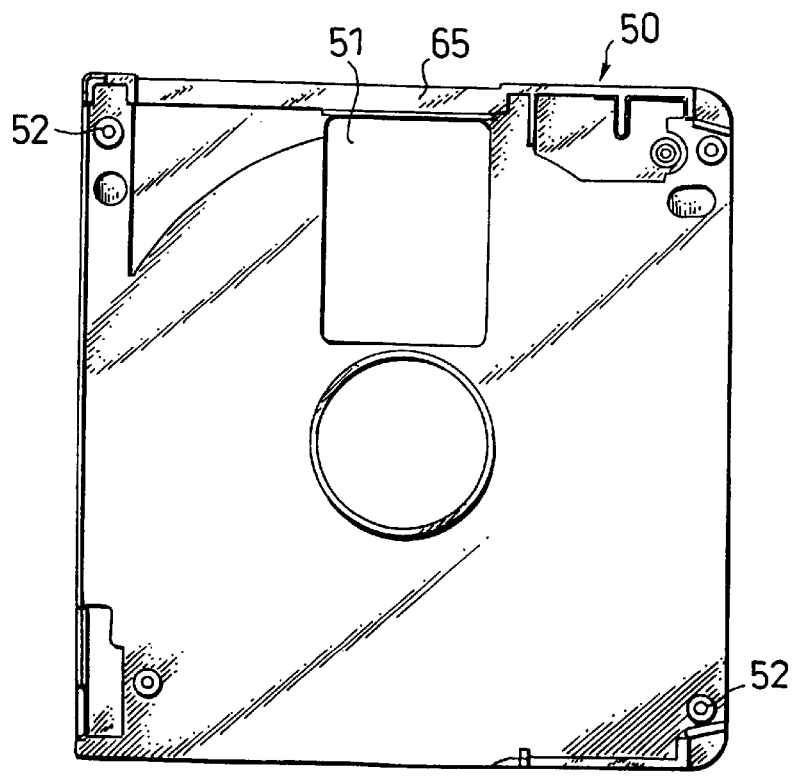
FIG. 31 is a plan view of the upper plate shown in FIG. 30, wherein an inner or lower surface thereof is placed up.
Figure 32:
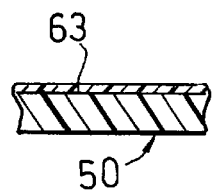
FIG. 32 is a fragmentary sectional view taken along line 32—32 of FIG. 30.
Figure 33:
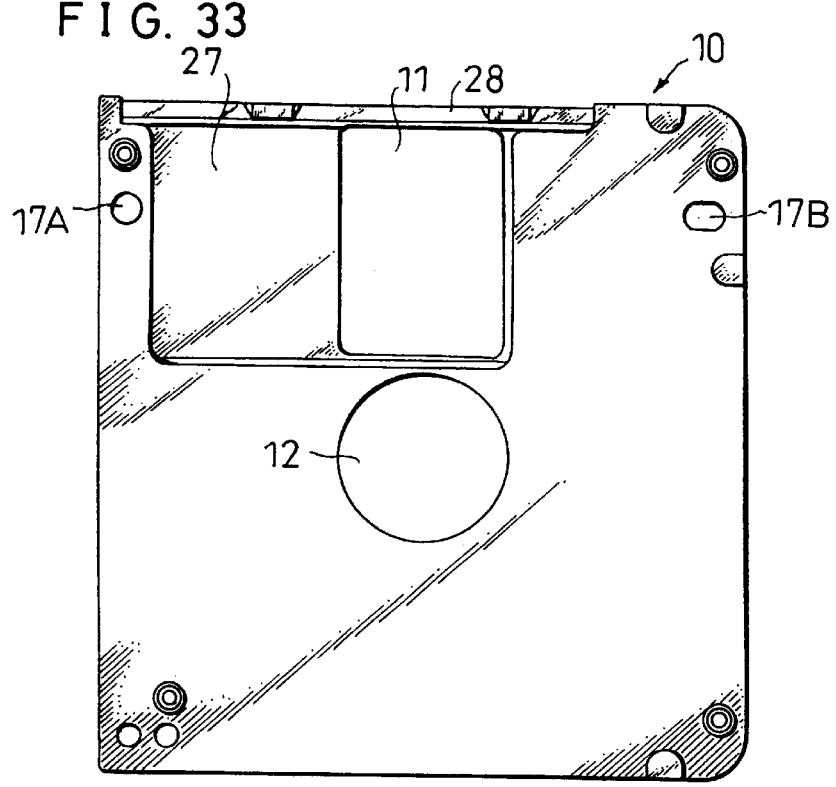
FIG. 33 is a plan view showing a lower plate.
Figure 34:
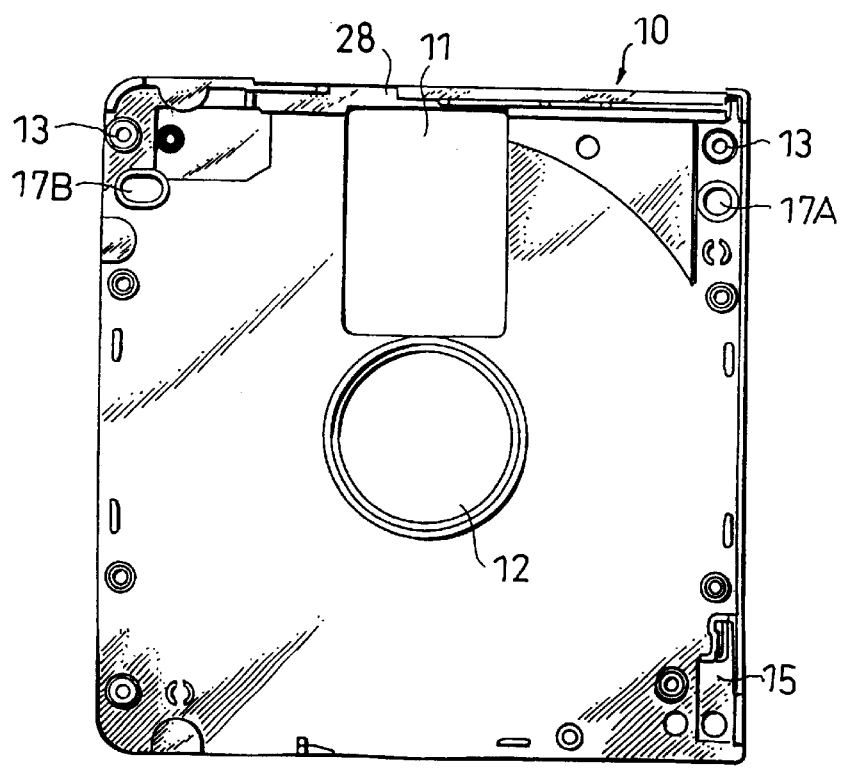
FIG. 34 is a plan view of the lower plate shown in FIG. 33, wherein an inner or upper surface is placed up.

In the illustrated embodiment, as described above, the thickness reduced region 62 and shutter lock receiving section 31 coincide in outer configuration with each other. Alternatively, the gate 61 and the thickness reduced region 62 may be positioned above a plug mounting section 15 of the lower plate 10 or a cutout 36 of the center frame 30, as shown in FIGS. 27 and 28 which will be detailedly described below. Also, coincidence in outer configuration between the thickness reduced region 62 of the upper plate 50 and the plug mounting section 15 of the lower plate 10 or the cutout 36 of the center frame 30 permits the thickness reduced region 62 to be inconspicuous. In the illustrated embodiment, the upper plate 50 and lower plate 10 are each made of a transparent or semi-transparent material. However, in the illustrated embodiment, it is merely required that only at least the upper plate is transparent.

Referring now to FIGS. 29 to 34, a further embodiment of a disc cartridge according to the present invention is illustrated. A disc cartridge of the illustrated embodiment is embodied in the form of a minidisc (MD). In the illustrated embodiment, substantially flat upper and lower plates 50 and 10 are joined to each other by means of mounting screws 86 through a center frame 30 interposedly arranged therebetween, to thereby provide a casing in which a disc-like medium 70 is received. The upper plate 50 of the casing is subjected on an outer surface thereof to an ultraviolet curing treatment, to thereby be formed thereon with an ultraviolet cured layer (UV treated layer) 63.

In the illustrated embodiment, the upper plate 50 and lower plate 10 are each made of a transparent or semi-transparent resin material and subjected on an outer surface thereof to a mirror finish, to thereby permit an interior of the disc cartridge to be externally visible through the plates. The upper plate 50 and lower plate 10 are preferably subjected to a surface treatment using an ultraviolet cured paint containing acrylic resin. The surface of each of the upper plate 50 and lower plate 10 may be rugged or free from ruggedness. Application of the ultraviolet cured paint is facilitated when the surface is less rugged. Also, coloring of the surface during the ultraviolet curing treatment contributes to a variation in color of the disc cartridge. The ultraviolet cured paints include an acrylic resin paint, an epoxy resin paint, an unsaturated polyester resin paint and the like. An acrylic resin paint is preferably used because it forms a hard film hard to take scratches as compared with an epoxy resin paint, and is rapidly cured and exhibits satisfactory adhesion as compared with an unsaturated polyester resin paint.

Also, the ultraviolet cured layer 63 is desirably formed on the outer surface of the upper plate 50 such as, for example, at least a region of the outer surface other than a region thereof covered with a shutter 80 slidably arranged so as to selectively close disc insertion holes 51 and 11. The ultraviolet curing treatment may be carried out by spraying regions of each of the upper and lower plates 50 and 10 with the ultraviolet cured paint or dipping the regions in a tank of the paint while connection sections 65 and 28 being interposed by a jig. Alternatively, it may be carried out by screen printing when the outer surface of the disc cartridge is flat.

In this instance, the painting is desirably carried out while nipping the connection sections 65 and 28 of the upper and lower plates 50 and 10 by means of a fixture, because it increases operating efficiency. This would often keeps the connection sections 65 and 28 from being coated with the paint because they are covered with the fixture during the painting, however, such a failure in coating of the connection sections with the paint does not cause any significant problem, because the connection sections are covered with the shutter 80 in non-use of the disc cartridge. Alternatively, the nipping may be carried out on shutter slide regions 27 and 60 rather than the connection sections 65 and 28.

The printing described above may be carried out while placing the upper and lower plates 50 and 10 on a suitable support. The printing provides the disc cartridge with a good appearance and facilitates adjustment of a thickness of the UV cured layer 63. In particular, when the casing of the disc cartridge is formed with recesses for the shutter slide regions 60 and 27 and a labeling area 64, a region of the casing other than the recesses is preferably provided thereon with the ultraviolet cured layer 63. The reason why the recesses of the disc cartridge are kept from being coated with the UV cured layer is that the recesses are much less damaged as compared with the remaining region of the cartridge.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A disc cartridge comprising:

an upper plate, a lower plate, a center frame arranged between said upper plate and said lower plate which are joined to each other to form a casing in which a disc-like medium is received;

said upper plate defining the whole upper surface region of the disc cartridge and said lower plate defining the whole lower surface region of the disc cartridge; and an engaged structure in which an engagement structure of an information recording/reproducing apparatus is engagedly fitted;

said engaged structure being constituted by only said lower plate;

wherein said engaged structure includes reference holes in each of which a respective pin of the information recording/reproducing apparatus is engagedly fitted; and said center frame is formed at portions thereof corresponding to said reference holes with relief holes each having a size greater than a corresponding one of said reference holes.

2. A disc cartridge as defined in claim 1, wherein said reference holes are each provided on an outer periphery thereof with an annular projection in a manner to project toward said center frame.

3. A disc cartridge as defined in claim 1, wherein said engaged structure includes notches engaged with disc cartridge drawing-in sections of the information recording/reproducing apparatus;

said notches each being constituted by a side wall section mounted on said lower plate in a manner to extend therefrom and a top wall section connected to said side wall section.

4. A disc cartridge as defined in claim 2, wherein said engaged structure includes notches engaged with disc cartridge drawing-in sections of the information recording/reproducing apparatus;

said notches each being constituted by a side wall section mounted on said lower plate in a manner to extend therefrom and a top wall section connected to said side wall section.

5. The disc cartridge of claim 1, wherein said reference holes each have an outer periphery and an annular projection at said outer periphery, said annular projection being arranged so that said annular projection is fitted into one of said relief holes when said center frame and said lower plate are assembled.

6. The disc cartridge of claim 5, wherein each of said relief holes have a lower surface with a peripheral portion and a U-shaped recess at the lower surface of the relief hole.

7. The disc cartridge of claim 6, wherein said annular projection is arranged so as to be inserted into said U-shaped recess when said center frame and said lower plate are assembled.

8. The disc cartridge of claim 7, wherein said annular projection is arranged so that said annular projection is spaced from said peripheral portion of said relief hole.

9. The disc cartridge of claim 8, wherein said center frame includes an abutment arranged outwardly of said relief hole, said abutment being arranged so that said abutment is abutted against said lower plate when said center frame and said lower plate are assembled.

\* \* \* \* \*

UNITED STATES PATENT AND TRADEMARK OFFICE
CERTIFICATE OF CORRECTION

PATENT NO. : 6,307,831 B1
DATED : October 23, 2001
INVENTOR(S) : Yukio Miyazaki, Masaru Ikebe and Masatoshi Okamura It is certified that error appears in the above-identified patent and that said Letters Patent is hereby corrected as shown below:

Column 1,
Line 20, after "in" insert -- its --.
Line 54, "causes" should read -- cause --.

Column 3,
Line 6, after "in" insert -- its --.
Line 22, delete "to provide" and insert therefor -- providing --.

Column 5,
Line 47, after "in" insert -- its --.
Line 66, after "region" insert -- of --.

Column 9,
Line 61, "semicircular" should read -- semi-circular --.

Column 10,
Line 16, after "as" delete "-".
Line 61, after "in" insert -- its --.

Column 14,
Line 8, should not be a new paragraph.

Column 16,
Line 33, delete "hard to take scratches" and insert therefor -- harder to scratch --.
Line 44, delete "while" and insert therefor -- with --.
Line 51, "keeps" should read -- keep --.

UNITED STATES PATENT AND TRADEMARK OFFICE
CERTIFICATE OF CORRECTION

PATENT NO. : 6,307,831 B1
DATED : October 23, 2001
INVENTOR(S) : Yukio Miyazaki, Masaru Ikebe and Masatoshi Okamura It is certified that error appears in the above-identified patent and that said Letters Patent is hereby corrected as shown below:

Column 18,
Line 24, delete "have" and insert therefor -- has --.

Signed and Sealed this

Ninth Day of July, 2002

Attest:

JAMES E. ROGAN
Attesting Officer
Director of the United States Patent and Trademark Office